(12) United States Patent
Yamamoto et al.

(10) Patent No.: US 8,665,689 B2
(45) Date of Patent: Mar. 4, 2014

(54) MULTI-LAYER OPTICAL DISC AND OPTICAL DISC APPARATUS

(75) Inventors: Shinichi Yamamoto, Osaka (JP);
Katsuya Watanabe, Ehime (JP)

(73) Assignee: Panasonic Corporation, Osaka (JP)

( * ) Notice: Subject to any disclaimer, the term of this patent is extended or adjusted under 35 U.S.C. 154(b) by 438 days.

(21) Appl. No.: 12/849,074

(22) Filed: Aug. 3, 2010

(65) Prior Publication Data

US 2011/0044149 A1  Feb. 24, 2011

(30) Foreign Application Priority Data

Aug. 18, 2009  (JP) ................................. 2009-188875

(51) Int. Cl.
| G11B 3/70 | (2006.01) |
| G11B 5/84 | (2006.01) |
| G11B 7/26 | (2006.01) |
| G11B 7/00 | (2006.01) |
| G11B 3/74 | (2006.01) |
| G11B 11/00 | (2006.01) |

(52) U.S. Cl.
USPC .......... 369/283; 369/94; 369/286; 369/44.13; 369/53.23; 369/53.28

(58) Field of Classification Search
USPC ............ 369/100, 283, 94, 286, 44.13, 53.23, 369/53.28
See application file for complete search history.

(56) References Cited

U.S. PATENT DOCUMENTS

| 5,793,720 A | 8/1998 | Nishikata |
| 6,424,614 B1* | 7/2002 | Kawamura et al. ........ 369/275.3 |
| 7,170,841 B2 | 1/2007 | Shoji et al. |
| 2006/0250922 A1* | 11/2006 | Sasaki ......................... 369/59.25 |
| 2006/0280082 A1* | 12/2006 | Yasukawa ..................... 369/53.2 |
| 2007/0076548 A1 | 4/2007 | Maegawa |
| 2007/0268802 A1* | 11/2007 | Muramatsu ................ 369/53.35 |
| 2007/0288948 A1 | 12/2007 | Kuroda et al. |
| 2009/0225639 A1* | 9/2009 | Miyashita et al. ......... 369/53.11 |
| 2010/0103793 A1* | 4/2010 | Nakamura et al. .............. 369/94 |
| 2010/0172226 A1* | 7/2010 | Nakamura et al. ........... 369/53.2 |

FOREIGN PATENT DOCUMENTS

| JP | 08-147762 | 6/1996 |
| JP | 2002-319144 | 10/2002 |
| JP | 2003-187458 | 7/2003 |
| JP | 2004-206849 | 7/2004 |
| JP | 2004-335101 | 11/2004 |
| JP | 2005-032290 | 2/2005 |
| JP | 2005-085326 | 3/2005 |
| JP | 2007-164965 | 6/2007 |
| JP | 2009-134822 | 6/2009 |
| WO | 2005/109413 A1 | 11/2005 |

OTHER PUBLICATIONS

Notice of Reasons for Rejection for corresponding Japanese Application No. 2010-170444 issued on May 14, 2013.

* cited by examiner

*Primary Examiner* — Aneeta Yodichkas
(74) *Attorney, Agent, or Firm* — Renner, Otto, Boisselle & Sklar, LLP

(57) ABSTRACT

[Problem] In a conventional multilayer optical disc, management information needs to be retrieved from the control area of its reference layer to find how many information layers there are in the optical disc.
[Means for Solving the Problem] A multilayer optical disc according to the present invention has multiple information layers that are stacked one upon the other. The information layers include at least one layer on which layer number information, indicating its own place in the multiple information layers, and information about the total number of information layers included are both stored.

2 Claims, 19 Drawing Sheets

FIG.2

| GROUP 1 | LP=25 | GROUP 1 | LP=10 | GROUP 2 | LP=6.25 | GROUP 3 | LP=5 |
|---|---|---|---|---|---|---|---|
| DUAL-LAYER BD | | FOUR-LAYER BD | | SIX-LAYER AND EIGHT-LAYER BDs | | TEN-LAYER TO SIXTEEN-LAYER BDs | |
| 1 | 100 | 1 | 100 | 1 | 100 | 1 | 100 |
| 2 | 75 | 2 | 90 | 2 | 93.75 | 2 | 95 |
| | | 3 | 80 | 3 | 87.5 | 3 | 90 |
| | | 4 | 70 | 4 | 81.25 | 4 | 85 |
| | | | | 5 | 75 | 5 | 80 |
| | | | | 6 | 68.75 | 6 | 75 |
| | | | | 7 | 62.5 | 7 | 70 |
| | | | | 8 | 56.25 | 8 | 65 |
| | | | | | | 9 | 60 |
| | | | | | | 10 | 55 |
| | | | | | | 11 | 50 |
| | | | | | | 12 | 45 |
| | | | | | | 13 | 40 |
| | | | | | | 14 | 35 |
| | | | | | | 15 | 30 |
| | | | | | | 16 | 25 |

FIG.3

| GROUP1 | LP=25 | GROUP 1 | LP=8 AND 10 | GROUP 2 | LP=5.75 AND 6.25 | GROUP 3 | LP=4 AND 5 |
|---|---|---|---|---|---|---|---|
| DUAL-LAYER BD | | FOUR-LAYER BD | | SIX-LAYER AND EIGHT-LAYER BDs | | TEN-LAYER TO SIXTEEN-LAYER BDs | |
| 1 | 100 | 1 | 100 | 1 | 100 | 1 | 100 |
| 2 | 75 | 2 | 90 | 2 | 93.75 | 2 | 95 |
| | | 3 | 82 | 3 | 88 | 3 | 91 |
| | | 4 | 72 | 4 | 81.75 | 4 | 86 |
| | | | | 5 | 76 | 5 | 82 |
| | | | | 6 | 69.75 | 6 | 77 |
| | | | | 7 | 64 | 7 | 73 |
| | | | | 8 | 57.75 | 8 | 68 |
| | | | | | | 9 | 64 |
| | | | | | | 10 | 59 |
| | | | | | | 11 | 55 |
| | | | | | | 12 | 50 |
| | | | | | | 13 | 46 |
| | | | | | | 14 | 41 |
| | | | | | | 15 | 37 |
| | | | | | | 16 | 32 |

FIG. 4

| GROUP 1 | LP=25 | GROUP 1 | LP=12.5 | GROUP 2 | LP=6.25 | GROUP 3 | LP=3.125 |
|---|---|---|---|---|---|---|---|
| DUAL-LAYER BD | | FOUR-LAYER BD | | SIX-LAYER AND EIGHT-LAYER BDs | | TEN-LAYER TO SIXTEEN-LAYER BDs | |
| 1 | 100 | 1 | 100 | 1 | 100 | 1 | 100 |
| 2 | 75 | 2 | 87.5 | 2 | 93.75 | 2 | 96.875 |
| | | 3 | 75 | 3 | 87.5 | 3 | 93.75 |
| | | 4 | 62.5 | 4 | 81.25 | 4 | 90.625 |
| | | | | 5 | 75 | 5 | 87.5 |
| | | | | 6 | 68.75 | 6 | 84.375 |
| | | | | 7 | 62.5 | 7 | 81.25 |
| | | | | 8 | 56.25 | 8 | 78.125 |
| | | | | | | 9 | 75 |
| | | | | | | 10 | 71.875 |
| | | | | | | 11 | 68.75 |
| | | | | | | 12 | 65.625 |
| | | | | | | 13 | 62.5 |
| | | | | | | 14 | 59.375 |
| | | | | | | 15 | 56.25 |
| | | | | | | 16 | 53.125 |

FIG.5

| GROUP 1 | LP=25 | GROUP 1 | LP=10 AND 12.5 | GROUP 2 | LP=6 AND 6.25 | GROUP 3 | LP=3 AND 3.125 |
|---|---|---|---|---|---|---|---|
| DUAL-LAYER BD | | FOUR-LAYER BD | | SIX-LAYER AND EIGHT-LAYER BDs | | TEN-LAYER TO SIXTEEN-LAYER BDs | |
| 1 | 100 | 1 | 100 | 1 | 100 | 1 | 100 |
| 2 | 75 | 2 | 87.5 | 2 | 93.75 | 2 | 96.875 |
| | | 3 | 77.5 | 3 | 87.75 | 3 | 93.875 |
| | | 4 | 65 | 4 | 81.5 | 4 | 90.75 |
| | | | | 5 | 75.5 | 5 | 87.75 |
| | | | | 6 | 69.25 | 6 | 84.625 |
| | | | | 7 | 63.25 | 7 | 81.625 |
| | | | | 8 | 57 | 8 | 78.5 |
| | | | | | | 9 | 75.5 |
| | | | | | | 10 | 72.375 |
| | | | | | | 11 | 69.375 |
| | | | | | | 12 | 66.25 |
| | | | | | | 13 | 63.25 |
| | | | | | | 14 | 60.125 |
| | | | | | | 15 | 57.125 |
| | | | | | | 16 | 54 |

FIG.15

| (WOBBLE) LOCATION WHERE ZERO IS DETECTED | TOTAL NUMBER INFO (FIRST HALF) | LAYER NO. INFO (SECOND HALF) LAYER ON WHICH LIGHT BEAM SPOT IS NOW LOCATED |
|---|---|---|
| | NONE | NONE | L0 LAYER |
| | 1ST WOBBLE | 2 | 1ST WOBBLE | L1 LAYER |
| | 2ND WOBBLE | 4 | 2ND WOBBLE | L2 LAYER |
| | 3RD WOBBLE | 8 | 3RD WOBBLE | L3 LAYER |
| | 4TH WOBBLE | 16 | ......... | |
| | 5TH WOBBLE | 20 | 19TH WOBBLE | L19 LAYER |
| | | | 20TH WOBBLE | L20 LAYER |

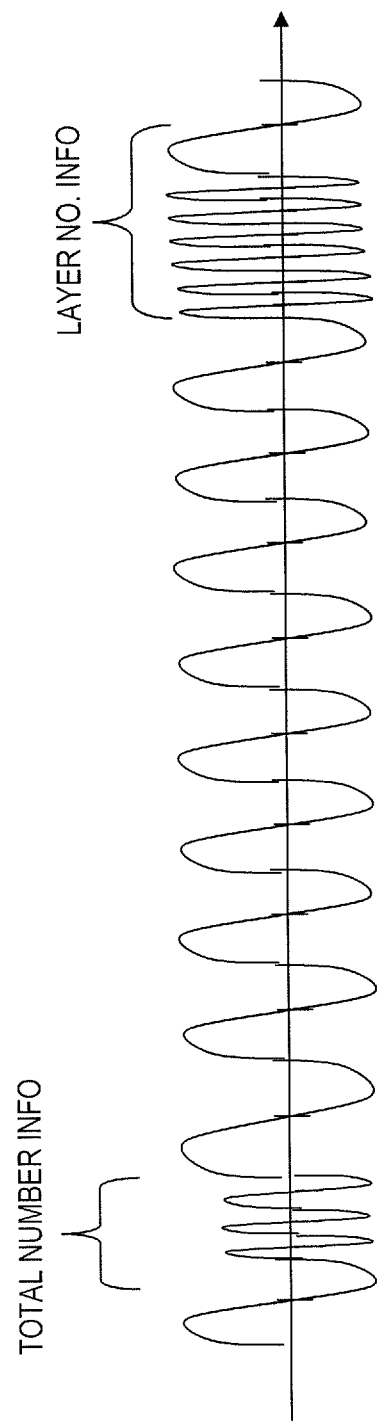

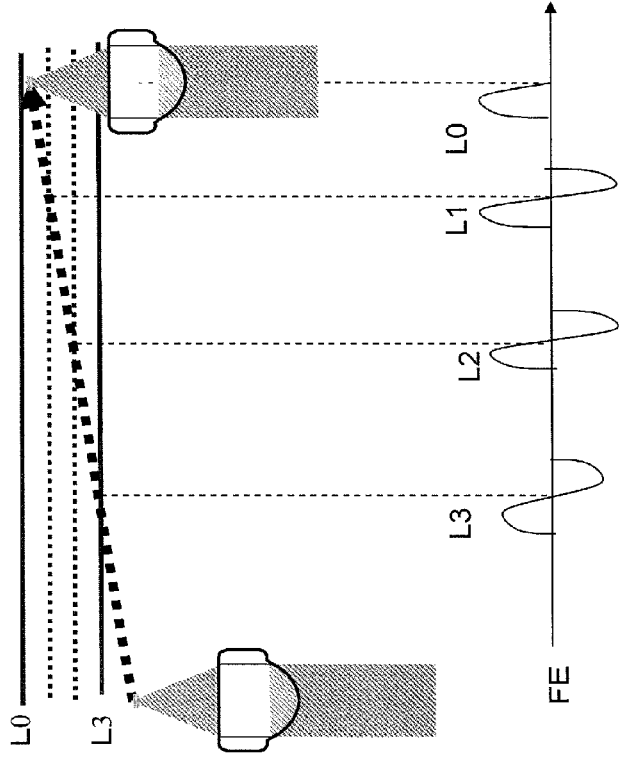
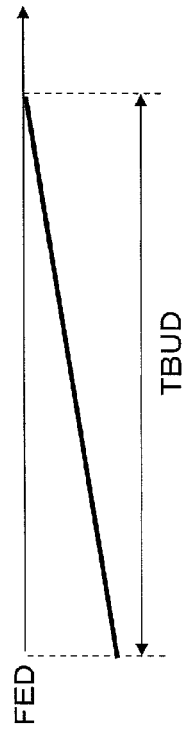
FIG.19A
FIG.19B

MULTI-LAYER OPTICAL DISC AND OPTICAL DISC APPARATUS

TECHNICAL FIELD

The present invention relates to a multilayer optical disc with three or more information layers and also relates to an optical disc drive that can quickly access a target one of the information layers of such a multilayer optical disc.

BACKGROUND ART

In optical disc technologies, data can be read out from a rotating optical disc by irradiating the disc with a relatively weak light beam with a constant intensity, and detecting the light that has been modulated by, and reflected from, the optical disc.

On a read-only optical disc, information is already stored as pits that are arranged spirally during the manufacturing process of the optical disc. On the other hand, on a rewritable optical disc, a recording material film, from/on which data can be read and written optically, is deposited by evaporation process, for example, on the surface of a substrate on which tracks with spiral lands or grooves are arranged. In writing data on a rewritable optical disc, data is written there by irradiating the optical disc with a light beam, of which the optical power has been changed according to the data to be written, and locally changing the property of the recording material film.

It should be noted that the depth of the pits and tracks and the thickness of the recording material film are both smaller than the thickness of the optical disc substrate. For that reason, those portions of the optical disc, where data is stored, define a two-dimensional plane, which is sometimes called a "storage plane" or an "information plane". However, considering that such a plane actually has a physical dimension in the depth direction, too, the term "storage plane (or information plane)" will be replaced herein by another term "information layer". Every optical disc has at least one such information layer. Optionally, a single information layer may actually include a plurality of layers such as a phase-change material layer and a reflective layer.

To read data that is stored on a rewritable optical disc or to write data on such an optical disc, the light beam always needs to maintain a predetermined converging state on a target track on an information layer. For that purpose, a "focus control" and a "tracking control" need to be done. The "focus control" means controlling the position of an objective lens along a normal to the surface of the information plane (such a direction will sometimes be referred to herein as "substrate depth direction") such that the focal point (or at least the converging point) of the light beam is always located on the information layer. On the other hand, the "tracking control" means controlling the position of the objective lens along the radius of a given optical disc (which direction will be referred to herein as a "disc radial direction") such that the light beam spot is always located right on a target track.

In order to perform such a focus control or a tracking control, the focus error or the tracking error needs to be detected based on the light that has been reflected from the optical disc and the position of the light beam spot needs to be adjusted so as to reduce the error as much as possible. The magnitudes of the focus error and the tracking error are represented by a "focus error (FE) signal" and a "tracking error (TE) signal", both of which are generated based on the light that has been reflected from the optical disc.

Dual-layer optical discs, in which two information layers are stacked on upon the other, have already been put on the market recently. And now, so-called "multilayer optical discs", including a stack of three or more information layers, are also being developed. In the following description, however, an optical disc in which N layers (where N is an integer that is equal to or greater than two) are stacked one upon the other (i.e., any optical disc with at least two layers) will be referred to herein as a "multilayer optical disc".

When data is being read from, or written on, a target one of the information layers of a multilayer optical disc, the optical disc drive needs to set the focus position of the light beam on the target information layer and form a tiny light beam spot on that information layer. As a single multilayer optical disc has multiple information layers, the positions of the light beam spot (i.e., its depths as measured from the disc substrate) need to be detected for the respective information layers in order to set the focus position of the light beam on the target information layer.

The light beam is emitted from a light source that is built in the optical pickup of the optical disc drive. The optical pickup includes an objective lens for converging the light beam that has been emitted from the light source and an actuator for moving that objective lens. The actuator works to bring the objective lens toward, or take it away from, the optical disc. In this manner, the optical disc drive can move the focus position of the light beam (or the position of the light beam spot) with respect to the optical disc, choose a target one of the information layers, and then form a light beam spot on that target information layer. The position of each information layer in the optical disc rotating continues to vary with respect to the optical pickup. However, by getting the focus control done as described above, the light beam spot can always keep up with the target information layer.

Patent Documents Nos. 1 to 4 disclose a technique for properly recognizing multiple information layers by writing layer-by-layer recognition information (e.g., layer numbers) on the respective information layers.

CITATION LIST

Patent Literature

Patent Document No. 1: Japanese Patent Applications Laid-Open Publication No. 2009-134822
Patent Document No. 2: PCT International Application Publication No. 2005/109413
Patent Document No. 3: Japanese Patent Application Laid-Open Publication No. 2005-32290
Patent Document No. 4: Japanese Patent Application Laid-Open Publication No. 2005-85326

SUMMARY OF INVENTION

Technical Problem

A dual-layer optical disc compliant with the Blu-ray Disc (BD) standard has an information layer called "L0 layer" at a depth of 100 µm under the disc surface and another information layer called "L1 layer" at a shallower level under the disc surface. The L0 layer is a so-called "reference layer" and management information, including information about the type of that optical disc, is stored in the inner control area of the L0 layer. When loaded with such a dual-layer optical disc on which a write or read operation is going to be performed, the optical disc drive needs to move the objective lens of the optical pickup from its rest position toward the dual-layer optical disc inserted and access the reference layer with a light beam. Specifically, after having started the disc loading process, the optical disc drive sets the focus on the reference layer and gets focus and tracking controls done on that reference layer. Then, the drive reads the track address, performs a seek operation to reach the control area, and then retrieves management information from the control area. It is not until this management information is retrieved that the drive can recognize the type of the given optical disc at long last. For that reason, it usually takes a lot of time for a conventional optical disc drive to determine how many information layers the given optical disc has. And if three or more information layers are stacked in a single multilayer optical disc, it is even more difficult for the drive to set focus on the target reference layer quickly during the disc loading process.

According to the conventional technique disclosed in Patent Document No. 1, identification information to recognize each of multiple information layers of a multilayer optical disc (i.e., the layer-by-layer recognition information) is stored on that information layer. That layer-by-layer recognition information is recorded on a track as a low-frequency wobble. Generally speaking, a PLL clock wobble signal is supposed to be written on each track at a frequency of 140 Hz. On the other hand, a wobble signal representing that layer-by-layer recognition information has as low a frequency as 3.5 to 10.5 kHz.

According to this conventional technique, after the focus position has been set on an arbitrary layer during the disc loading process, the layer-by-layer recognition information needs to be retrieved while a focus control and a tracking control are performed on that information layer. As a result, this technique tells the user the exact position (or the layer number) of the information layer on which the focus position of the light beam has been set.

Nevertheless, to obtain the management information including information about the exact type of the given optical disc, the focus position needs to be set again on the reference layer of that optical disc and the management information should be retrieved from the control area of the reference layer after all. In that case, the focus position should be shifted from the information layer on which the focus position has been set for the first time to the reference layer. However, that focus position shift to the reference layer cannot be done quickly and accurately.

On top of that, if the reference layer is located at the deepest level under the disc surface, the objective lens of the optical pickup could collide against the surface of the optical disc while attempting to set the focus position on that deep reference layer.

It is therefore an object of the present invention to provide, first and foremost, a multilayer optical disc and optical disc drive that can set a focus position on a reference layer quickly even if the given optical disc has a lot of information layers.

Another object of the present invention is to provide an optical disc drive that can set the focus position of a light beam on the reference layer without making the objective lens of the optical pickup collide against the optical disc even if the reference layer is located at the deepest level under the disc surface and also provide a method of driving such an drive.

Solution to Problem

A multilayer optical disc according to the present invention has multiple information layers that are stacked one upon the other. The multiple information layers include: a reference layer, on which management information, including information about the type of the optical disc, is stored; and at least one more information layer, on each of which layer number information, indicating its own place in the multiple information layers, and information about the total number of the information layers included are both stored.

In one preferred embodiment, the layer number information and the total number information are recorded as track wobbles on the at least one more information layer during the manufacturing process of the optical disc.

In another preferred embodiment, the at least one more information layer on which the layer number information and the total number information are stored is arranged between the surface of the optical disc and the reference layer.

In still another preferred embodiment, the layer number information and the total number information are stored on every information layer that is located between the surface of the optical disc and the reference layer.

In yet another preferred embodiment, the reference layer is more distant from the surface of the optical disc than any other one of the multiple information layers is.

In a specific preferred embodiment, the reference layer is located at a depth of 100 μm under the surface of the optical disc.

A method of driving an optical disc drive according to the present invention includes the steps of: (A) setting the focus position of a light beam on a target one of the information layers of a multilayer optical disc according to any of the preferred embodiments of the present invention described above, on which the layer number information and the total number information are both stored, and performing a focus control and a tracking control on that target layer; and (B) retrieving the layer number information and the total number information from the target information layer.

In one preferred embodiment, the method further includes the step (C) of shifting the focus position of the light beam from that target information layer, from which the layer number information and the total number information have been retrieved, to the reference layer after the step (B) has been performed.

In another preferred embodiment, the step (A) includes setting the focus position of the light beam on one of the information layers, which is located closer to the surface of the optical disc than the reference layer is and on which the layer number information and the total number information are stored, and performing a focus control and a tracking control on that information layer.

Another optical disc drive according to the present invention is compatible with a multilayer optical disc including multiple information layers that include a reference layer on which management information, including information about the type of the optical disc loaded, is stored and at least one more information layer, on each of which layer number information, indicating its own place in the multiple information layers, and information about the total number of the information layers included are both stored. The drive includes: a driving section for rotating the optical disc loaded; an optical pickup having the ability to set the focus position of a light beam on an arbitrary one of the information layers of the optical disc; a control section, which controls the optical pickup to set the focus position of the light beam on a target one of the information layers of the multilayer optical disc on which the layer number information and the total number information are stored, and which performs a focus control and a tracking control on that target information layer; and a layer information detecting section for retrieving, in response to a signal supplied from the optical pickup, the layer number information and the total number information from the target information layer.

In one preferred embodiment, before setting the focus position of the light beam on the reference layer of the optical disc and performing a focus control and a tracking control on the reference layer, the control section sets the focus position of the light beam on one of the information layers, which is located closer to the surface of the optical disc than the reference layer is and on which the layer number information and the total number information are stored, and performs the focus control and the tracking control on that layer. The layer information detecting section retrieves the layer number information and the total number information from that information layer that is located closer to the surface of the optical disc than the reference layer is.

Advantageous Effect of Invention

In a multilayer optical disc according to the present invention, layer number information, indicating its own place in the optical disc, and total number information, indicating how many information layers there are in the disc, are stored on at least one information layer. Thus, the optical disc drive can easily sense how many information layers there are in the given multilayer optical disc and can see exactly which information layer the focus is now set on.

Also, in the optical disc drive and its driving method according to the present invention, while setting a focus on a target information layer that is located deep inside the given optical disc, the drive once sets a focus on another information layer that is located closer to the disc surface than the target information layer is, and retrieves the layer number information and the total number information from the former layer. Thus, the drive can see the "distance" from that another information layer to the target information layer that is located deeper inside the optical disc. As a result, the drive can set the focus on the target deeper information layer in a short time while preventing the objective lens of the optical pickup from colliding against the optical disc.

BRIEF DESCRIPTION OF DRAWINGS

FIG. 2 shows an exemplary arrangement of information layers in various types of multilayer optical discs as Pattern #1.

FIG. 3 shows another exemplary arrangement of information layers in various types of multilayer optical discs as Pattern #2.

FIG. 4 shows still another exemplary arrangement of information layers in various types of multilayer optical discs as Pattern #3.

FIG. 5 shows still another exemplary arrangement of information layers in various types of multilayer optical discs as Pattern #4.

Figure 13:
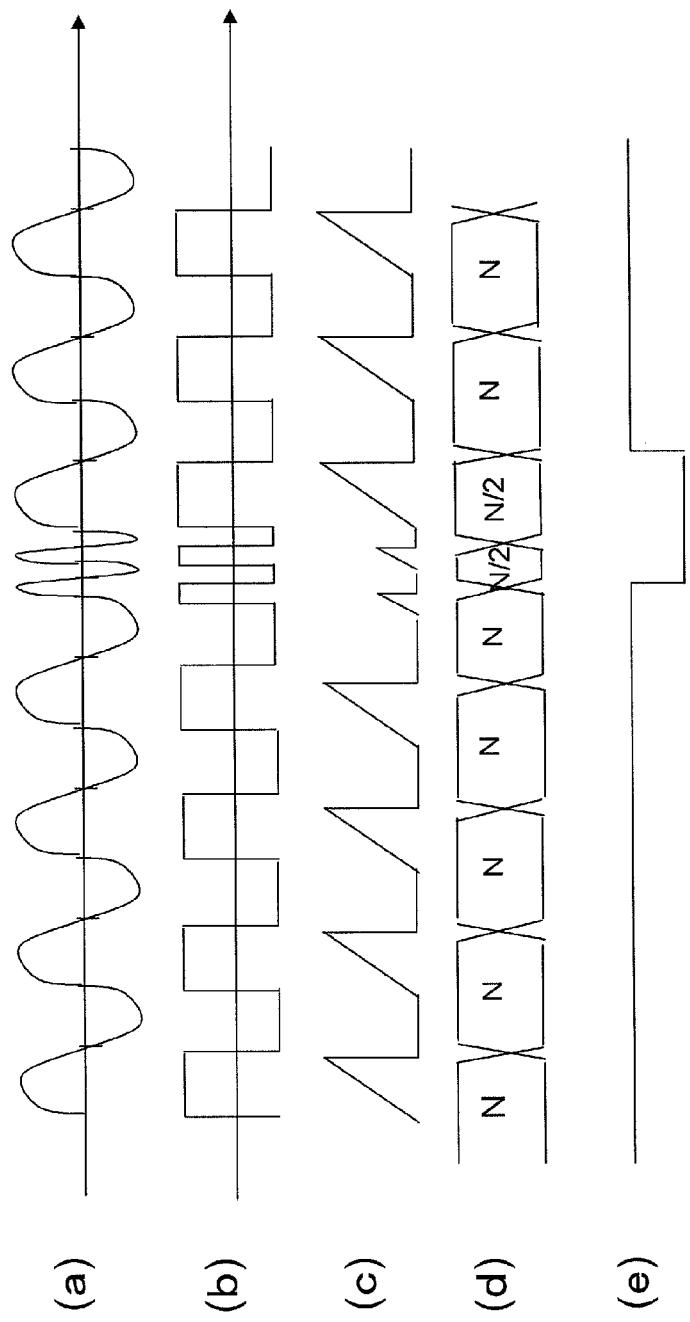

Portions (a) through (e) of FIG. 13 illustrate the waveforms of signals generated by a signal processing section.

Figure 14:
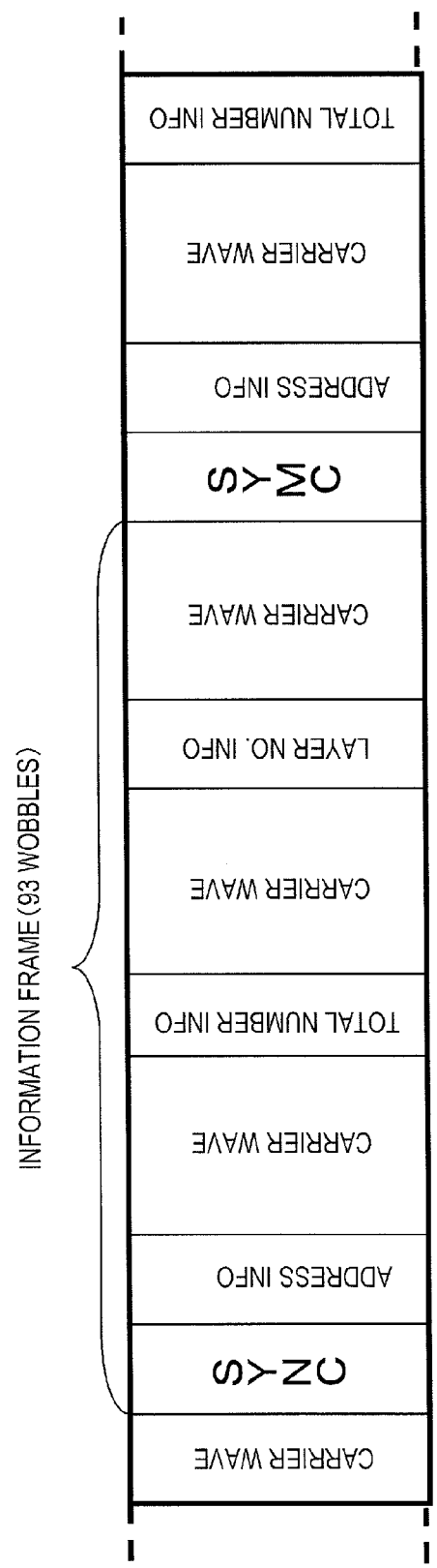

FIG. 14 shows the internal structure of one information frame (consisting of 93 wobbles).

FIG. 15 shows different combinations of wobble locations where zero is detected for the total number information in the first half of one information frame and for the layer number (No.) information indicating on which information layer the light beam spot is currently located in the second half of that information frame.

Figure 16:
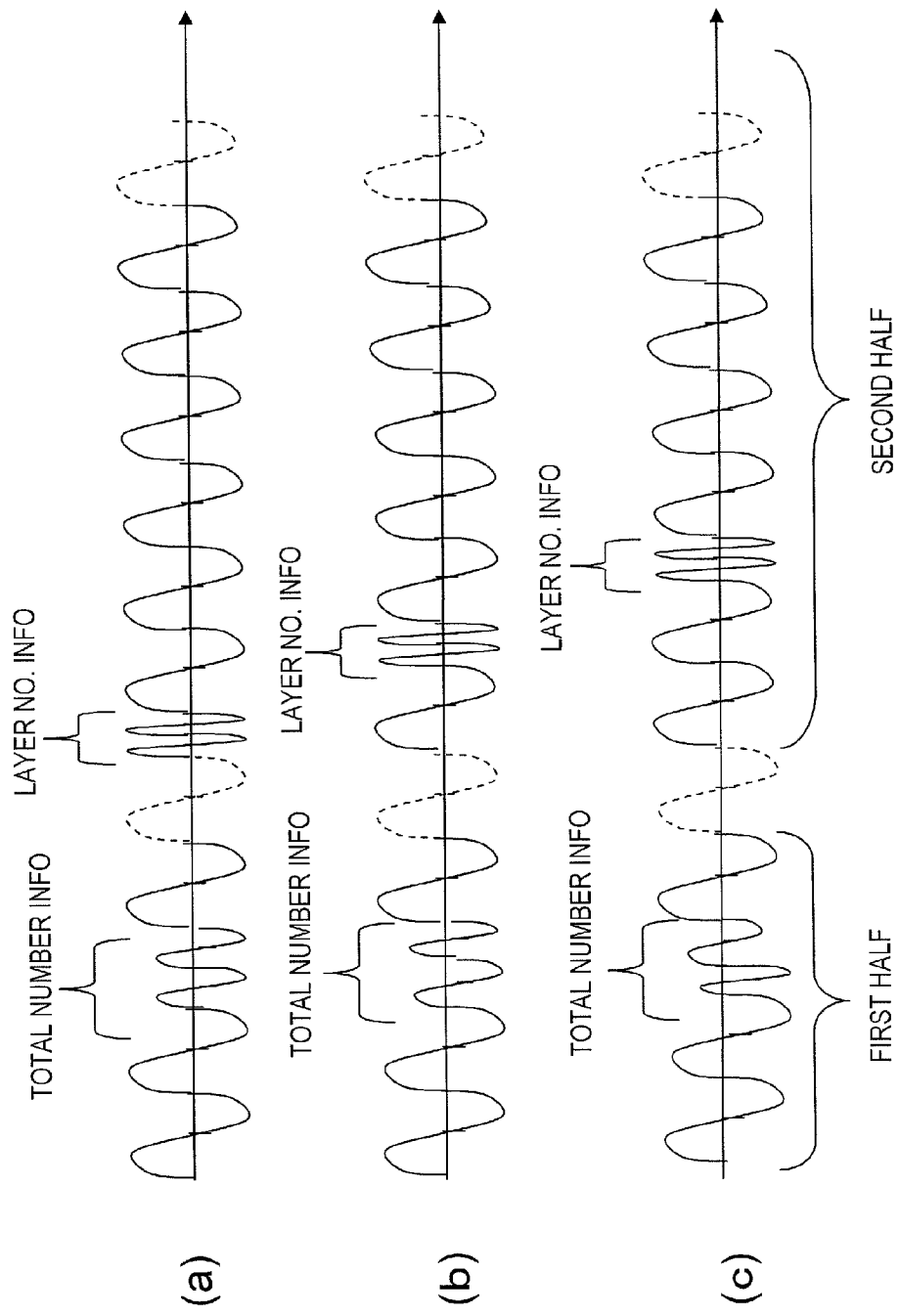

Portions (a) through (c) of FIG. 16 illustrate the waveforms of wobble signals in a situation where the given optical disc has eight information layers in total.

FIG. 17 illustrates how the total number information and the layer number information of an optical disc are represented by the sum of wobble locations that have been subjected to FM modulation.

Figure 18A:
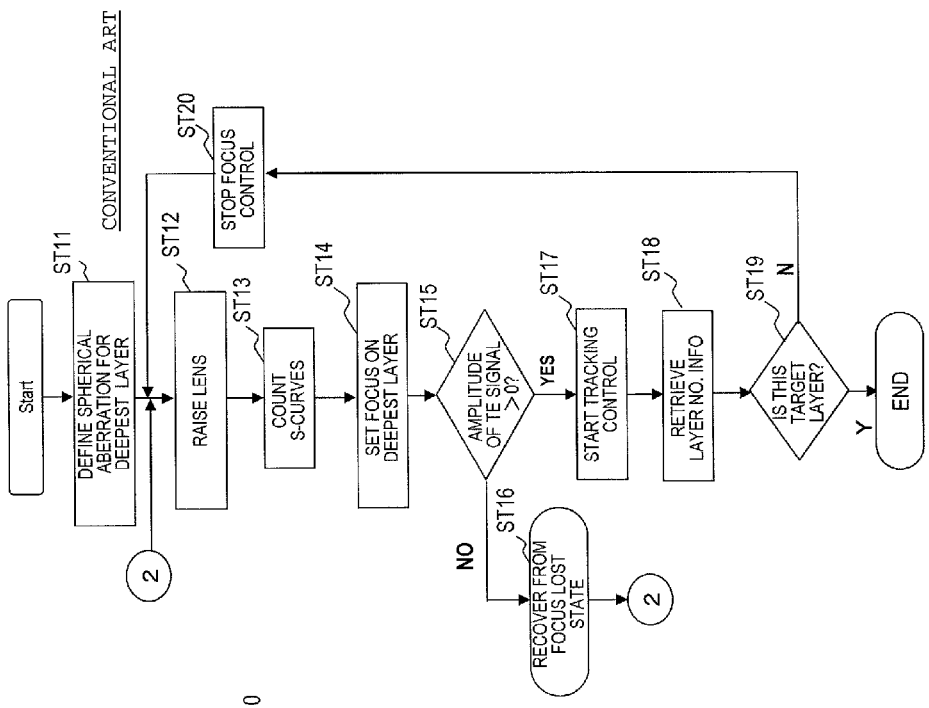

FIG. 18A illustrates a flowchart showing the procedure of the disc loading process according to a preferred embodiment.

Figure 18B:
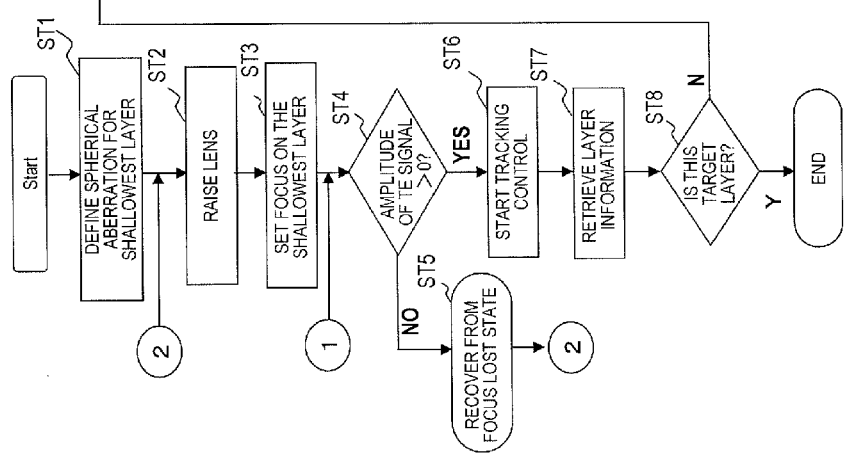

FIG. 18B illustrates a flowchart showing the procedure of a typical disc loading process to be carried out by a conventional optical disc drive.

FIG. 19A illustrates how a lens moves with respect to a disc and how the focus error (FE) and focus drive (FED) signals change their waveforms in the meantime in a situation where the disc loading process is carried out following the procedure of a preferred embodiment.

FIG. 19B illustrates how the lens moves with respect to the disc and how the focus error (FE) and focus drive (FED) signals change their waveforms in the meantime in a situation where the disc loading process is carried out following the conventional procedure.

DESCRIPTION OF EMBODIMENTS

Embodiment 1

First of all, the structure of a multilayer optical disc as a specific preferred embodiment of the present invention will be described.

Figure 1A:
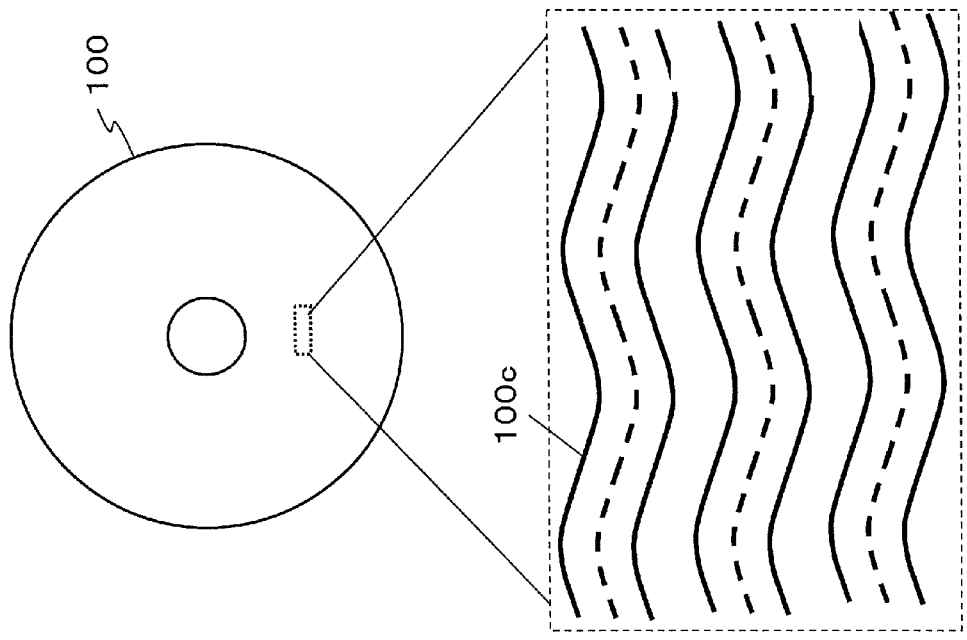
FIG. 1A schematically illustrates an exemplary cross-sectional structure of information layers that are arranged in a multilayer optical disc as a preferred embodiment of the present invention.

As shown in FIG. 1A, the multilayer optical disc 100 of this preferred embodiment has n information layers L0, L1, ..., Ln-2 and Ln-1, which are stacked one upon the other. In this case, n is an integer that is equal to or greater than three and that indicates the total number of information layers included in the optical disc 100.

In FIG. 1A, illustrated is an objective lens 230, which is provided for an optical disc drive. This objective lens 230 forms part of an optical pickup and converges a light beam that has been emitted from a light source (not shown). The point of convergence of the light beam, i.e., its focus position, can be adjusted by changing the position of the objective lens 230 in the optical axis direction. In the example illustrated in FIG. 1A, the focus position of the light beam is now located on the information layer Ln-1. That is to say, the light beam is now focused on the information layer Ln-1.

In this preferred embodiment, the information layer L0 is located deeper than any other information layer in the optical disc 100. In other words, the information layer L0 is located most distant from the disc surface 100a. The information layer L1 is located one step closer to the disc surface 100a than the information layer L0 is. And the information layer Ln-1 is the $n^{th}$ information layer as counted from the deepest information layer of the optical disc 100, and is located closer to the light incident surface of the optical disc 100 than any other information layer is.

The multiple information layers L0, L1, ..., Ln-2 and Ln-1 include a reference layer on which management information, including information about the type of the given optical disc 100, is stored. On some or all of these information layers L0, L1, ..., Ln-2 and Ln-1, "layer number information" indicating their own place in the information layers and "total number information" indicating how many information layers there are in the optical disc are both stored. In the following description, the layer number information and the total number information will sometimes be collectively referred to herein as "layer information". In the multilayer optical disc 100 of this preferred embodiment, the information layer L0 is the reference layer. The layer number information and the total number information are preferably stored in each of the information layers L0, L1, ..., Ln-2 and Ln-1, but could be stored on only some of them.

Figure 1B:
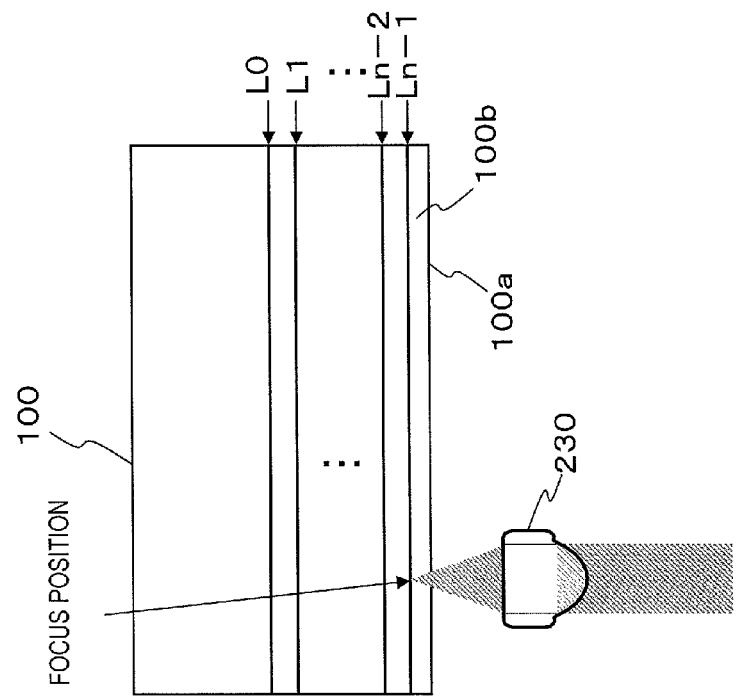
FIG. 1B is a plan view illustrating the general shape of wobbling tracks of a multilayer optical disc as a preferred embodiment of the present invention.

On the multilayer optical disc 100 of this preferred embodiment, the layer information is already recorded when the optical disc 100 is manufactured at a factory. In a preferred embodiment of the present invention, the layer information is recorded as the track wobble of an information layer. FIG. 1B schematically illustrates the shape of tracks 100c of an information layer Li (where i is an integer that satisfies 0≤i≤n-1) of the multilayer optical disc 100. The tracks 100c shown in FIG. 1B wobbles regularly at a constant frequency, and a clock signal can be generated synchronously with that wobbling. As will be described later, the period and phase of that wobbling can be detected from the information layer Li (where i is an integer that satisfies 0≤i≤n-1) of the multilayer optical disc 100 based on its reflected light. According to this preferred embodiment, a waveform that has a different period or phase from the wobbling waveform given to the tracks to generate clock pulses is superposed.

The layer number information may be a numerical value indicating the place of a given information layer as counted either from the deepest information layer in the optical disc 100 or from the disc surface 100a. Alternatively, the layer number information may also be a numerical value representing the depth of that information layer under the disc surface 100a. Still alternatively, the layer number information may even be a piece of information in a different form that is used to distinguish that information layer from the others. That is why in the layer information, the layer number information may also be called "layer-by-layer recognition information" or "layer-by-layer identification information".

The information layers L0, L1, ..., Ln-2 and Ln-1 may be arranged in various manners in the multilayer optical disc 100. That is to say, the information layers L0, L1, ..., Ln-2 and Ln-1 may be arranged at various levels (i.e., various depths under the disc surface 100a). However, considering compatibility with single- and dual-layer BDs that have already been put on the market, it is preferred that the reference layer always have a constant depth of 100 μm (i.e., the distance from the disc surface to the reference layer is always 100 μm). That is why the multilayer optical disc 100 of this preferred embodiment has a reference layer at the depth of 100 μm.

If the interval between the information layers L0, L1, ..., Ln-2 and Ln-1 were too narrow in the multilayer optical disc 100, then crosstalk would be produced between the information layers. For that reason, the interval between the information layers (which will be referred to herein as "layer pitch (LP)") is preferably equal to or greater than 3 μm. Also, considering the influence of scratches and dust, the cover layer 100b cannot be too thin (i.e., the distance from the disc surface 100a to the shallowest layer under the disc surface 100a cannot be too short). That is why since a BD requires as high an NA as 0.85, the cover layer 100 preferably has a thickness of at least 25 μm.

In view of these considerations, dual-layer, four-layer, six-layer, eight-layer, ten-layer, twelve-layer, fourteen-layer, and sixteen-layer optical discs could have an arrangement in any of the four patterns shown in FIG. 2, 3, 4 or 5.

According to Patterns #1 and #2 shown in FIGS. 2 and 3, the interval between each pair of adjacent information layers is as broad as it can be. Specifically, in the example of Pattern #1, a regular interval is left between each pair of adjacent information layers. More specifically, in a sixteen-layer optical disc, the layer-to-layer interval becomes 5 μm and the cover layer has a thickness of 25 μm. On the other hand, in the example of Pattern #2, the layer-to-layer interval is changed alternately between two values to cancel the crosstalk phenomenon. In the sixteen-layer optical disc, the interval between an odd-numbered layer and an even-numbered layer becomes 5 μm, the interval between an even-numbered layer and an odd-numbered layer becomes 4 μm, and the cover layer has a thickness of 32 μm.

On the other hand, according to Patterns #3 and #4 shown in FIGS. 4 and 5, the distance from the surface to the layer that is closest to that surface (i.e., the thickness of the cover layer) is given a top priority. In the example of Pattern #3, a regular interval is left between each pair of adjacent information layers. For instance, a sixteen-layer optical disc has a layer-to-layer interval of 3.125 μm and its cover layer has a thickness of 53.125 μm. On the other hand, in the example of Pattern #4, the layer-to-layer interval is changed alternately between two values to cancel the crosstalk phenomenon. In the sixteen-layer optical disc, the interval between an odd-numbered layer and an even-numbered layer becomes 3.125 μm, the interval between an even-numbered layer and an odd-numbered layer becomes 3 μm, and the cover layer has a thickness of 54 μm.

Generally speaking, in a multilayer optical disc, the layer-to-layer interval and the thickness of the cover layer are actually somewhat greater or smaller than those exemplary values due to some variation that inevitably occurs during a manufacturing process. Nevertheless, typical arrangements of multilayer optical discs can be roughly classified into those four patterns described above. The focus jump of this preferred embodiment is commonly applicable to all of those four patterns. For that reason, only Pattern #1 will be described in detail and the other patterns #2, #3 and #4 will be described just complementarily as needed.

Figure 6:
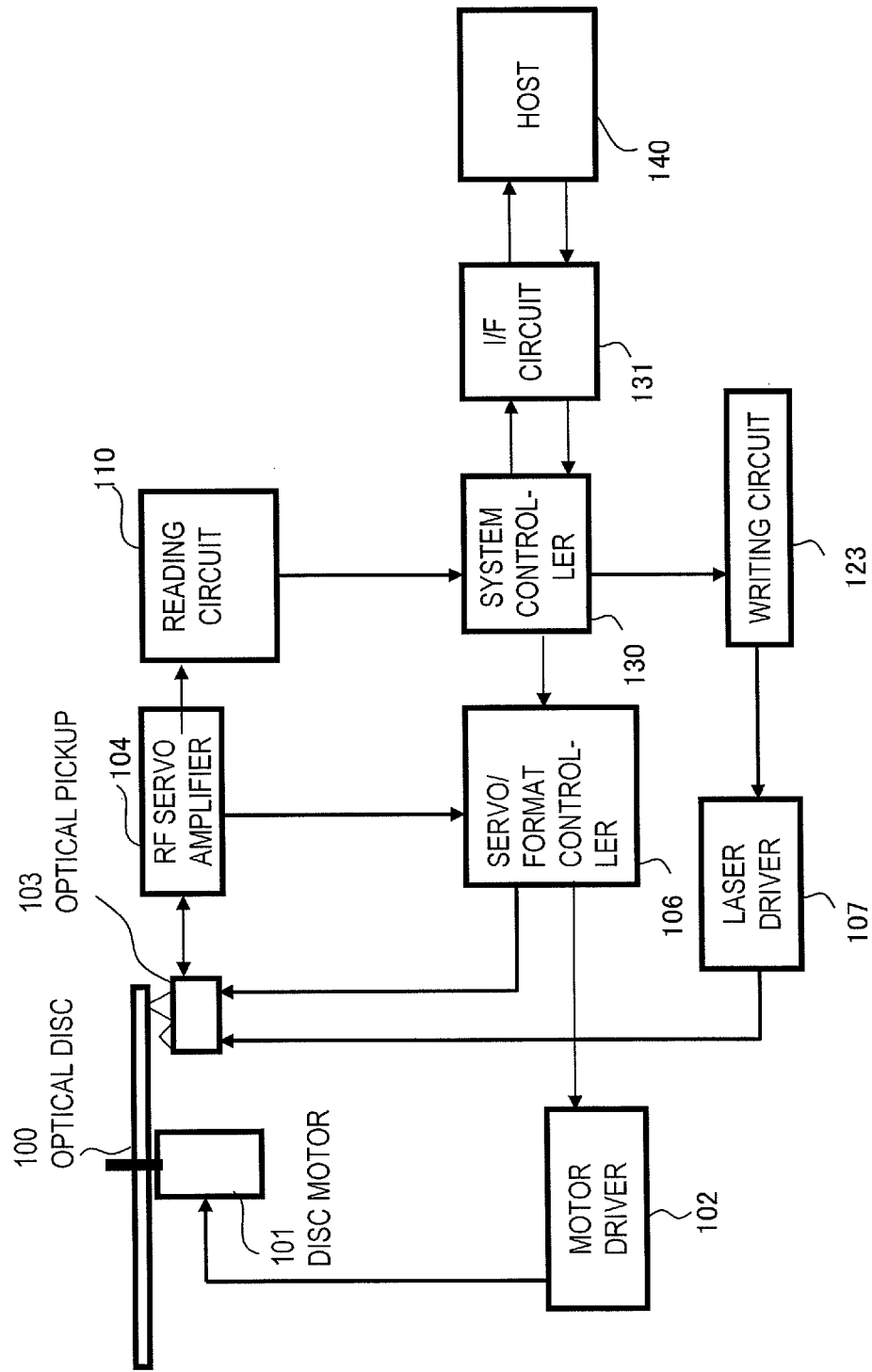
FIG. 6 is a block diagram illustrating an optical disc drive as a preferred embodiment of the present invention.
Figure 7:
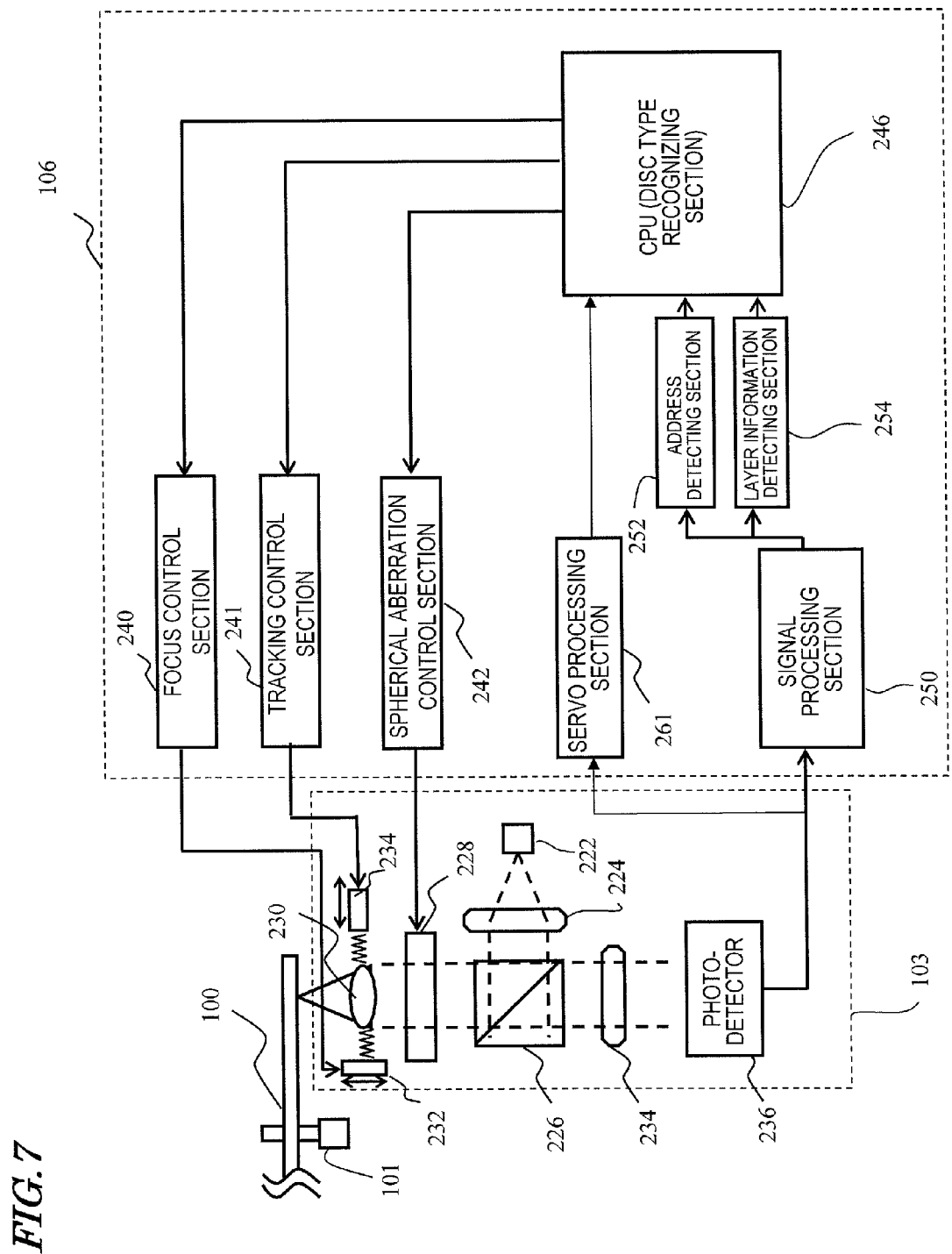
FIG. 7 is a block diagram illustrating a detailed configuration for a servo/format controller and its surrounding circuit sections in the optical disc drive as the preferred embodiment of the present invention.
Figure 8:
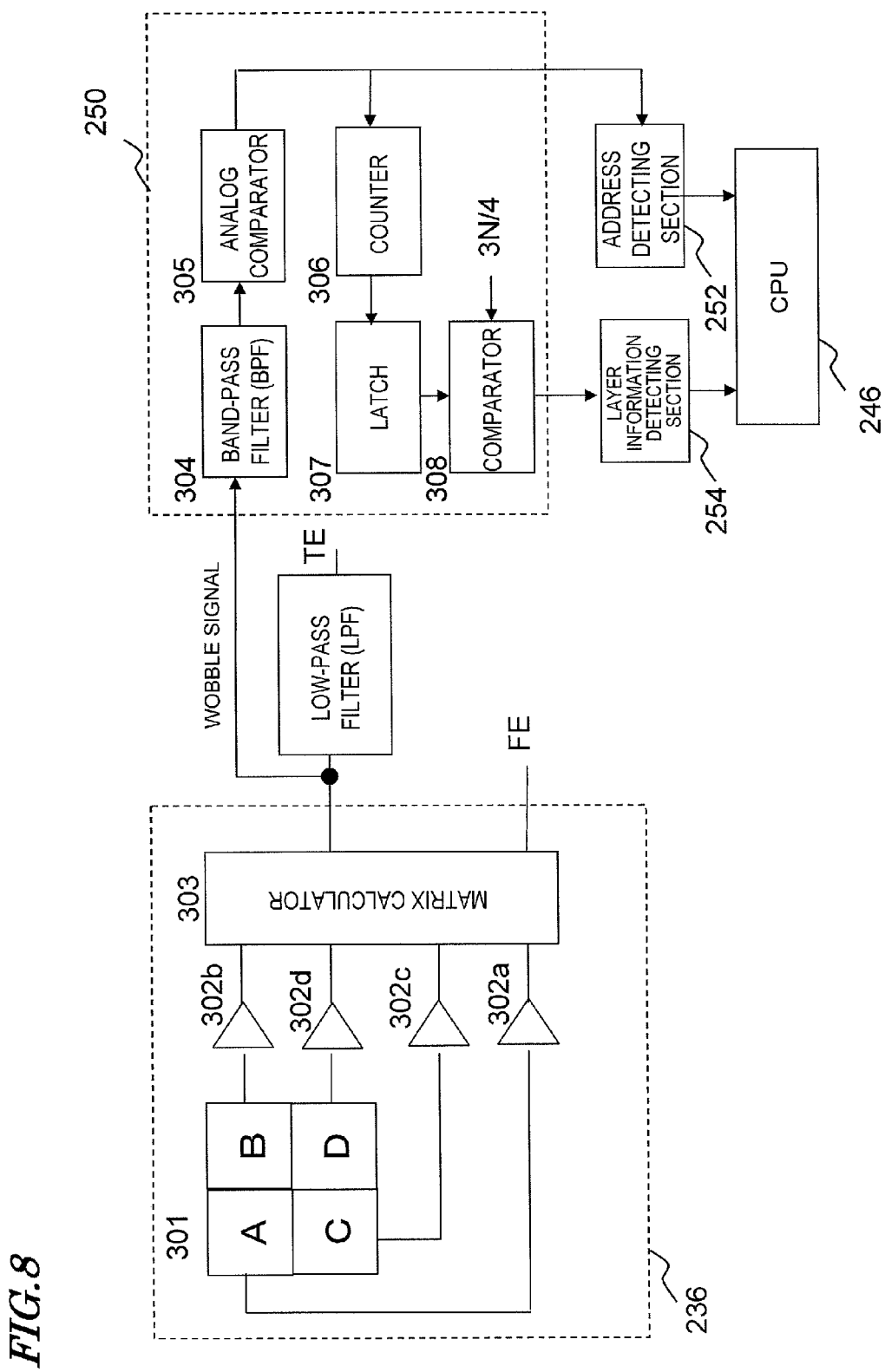
FIG. 8 is a block diagram illustrating a more detailed configuration for detecting and understanding layer-by-layer recognition information in the optical disc drive of the present invention.

FIG. 6 is a block diagram illustrating an optical disc drive as a specific preferred embodiment of the present invention. FIG. 7 is a block diagram illustrating a detailed configuration for the servo/format controller 106 shown in FIG. 6 and its surrounding sections. And FIG. 8 is a block diagram illustrating a more detailed configuration for detecting and understanding the layer-by-layer recognition information in the optical disc drive of this preferred embodiment.

When loaded with a multilayer optical disc 100 such as the one illustrated in FIG. 1, the optical disc drive of this preferred embodiment can retrieve a piece of information about the total number of information layers included in the multilayer optical disc 100 (i.e., the total number information) and the layer number information, indicating the place of the given information layer in the optical disc, from the multilayer optical disc 100.

The optical disc drive of this preferred embodiment includes a focus control section 106 (identified by the reference numeral 240 in FIG. 7) for performing a focus control on each information layer of the multilayer optical disc 100, a tracking control section 106 (identified by the reference numeral 241 in FIG. 7) for performing a tracking control on the information layer on which the focus control has been established, and a multilayer decision section 106 (identified by the reference numeral 246 in FIG. 7) for determining how many information layers the given multilayer optical disc has and exactly which of those information layers the focus is now being set on by retrieving the total number information of the multilayer optical disc and the layer number information after the tracking control has been done.

Hereinafter, the respective components of the optical disc drive of this preferred embodiment will be described one by one.

The optical disc drive of this preferred embodiment includes an optical pickup 103, which includes an optical system for converging a light beam onto the optical disc 100, a photodetector for detecting the light that has been reflected from the optical disc, and a laser diode as a light source. The optical disc drive further includes a servo/format controller 106, which controls the operation of the optical pickup 103 to read the address information that has been stored in a modulated form at the edges of wobbling tracks, a reading circuit 110 for reading a signal that has been recorded on a groove track of the optical disc 100 and detected by the optical pickup 103, and a writing circuit 123 for writing the information on the optical disc 100 by getting pulsed laser beams emitted from a laser diode by the laser driver 107 by a predetermined modulation technique according to the information to be written.

The optical pickup 103 irradiates the optical disc 100, which has been mounted on an optical disc motor 101, with a converged laser beam. An RF servo amplifier 104 generates an electrical signal based on the light that has been reflected from the optical disc 100. The servo/format controller 106 performs a focus control and a tracking control on the optical disc 100 that has been mounted on the optical disc motor 101.

The servo/focus controller 106 includes a disc type recognizing section for determining, by irradiating the optical disc 100 with a light beam using the light source and lenses, whether the given optical disc 100 is a BD or not, and whether the disc 100 has only one layer, two layers, or more than two layers.

The reading circuit 110 gets the electrical signal, which has been supplied from the RF servo amplifier 104, equalized by a waveform equalizer, for example, thereby generating an analog read signal, which is converted into a digital signal and then synchronized with a read clock signal (i.e., a reference clock signal) that has been generated based on the wobbling tracks. In this manner, the data can be extracted. Thereafter, the data is subjected to predetermined demodulation and error correction and then supplied to a system controller 130, which transfers the data to a host 140 by way of an I/F circuit 131.

Then, the writing circuit 123 adds a header and redundant bits for error correction to the data, modulates it into a predetermined modulation pattern (by predetermined modulation technique), and then gets pulsed laser beams emitted from the laser diode in the optical pickup 103 by the laser driver 107 in order to write the information that has been supplied from the host 140 by way of the I/F circuit 131 on the optical disc 100. By varying the reflectance of the recording material (such as an organic material or a phase change material) of the optical disc 100 according to the degree of intensity modulation of the laser beam that has been incident on the optical disc 100, information is written as ones or zeros.

FIG. 7 is a block diagram illustrating, in further detail, the optical pickup 103 and the servo/format controller 106 shown in FIG. 6 and their surrounding circuit sections. Hereinafter, the optical disc drive of this preferred embodiment will be described in further detail with reference to FIG. 7.

First, the configuration of the optical pickup 103 will be described. The optical pickup 103 includes a light source 222, a coupling lens 224, a polarization beam splitter 226, a spherical aberration correction section 228, an objective lens 230, actuators 232, 234, a condenser lens 234 and a photodetector 236.

The light source 222 may be a semiconductor laser diode that emits a light beam. In FIG. 7, only one light source 222 is illustrated for the sake of simplicity. However, the light source may actually be made up of three semiconductor laser diodes, which emit light beams with mutually different wavelengths. Specifically, the single optical pickup includes multiple semiconductor laser diodes for emitting light beams with mutually different wavelengths for CDs, DVDs and BDs, respectively.

The coupling lens 224 transforms the light beam that has been emitted from the light source 222 into a parallel light beam. The polarization beam splitter 226 reflects the parallel light beam that has come from the coupling lens 224. The position of the semiconductor laser diode to use in the light source 222 and the wavelength of the light beam emitted will change according to the type of the given optical disc. That is why the configuration of the best optical also changes according to the type of the given optical disc 100. For that reason, the configuration of the actual optical pickup 103 is more complicated than the illustrated one.

The objective lens 230 converges the light beam that has been reflected from the polarization beam splitter 226. The actuators 232 and 234 control the position of the objective lens 230 in response to the FE and TE signals so that the objective lens 230 is always located at its predetermined position. In reading or writing data from/on a target one of the information layers of the optical disc 100, the focal point of the light beam that has been converged by the objective lens 230 is located on the target information layer, thereby forming a light beam spot on that information layer. In FIG. 7, only one objective lens 230 is illustrated. Actually, however, there are multiple objective lenses 230, one of which is selectively used according to the type of the given optical disc 100. When data is being read or written, focus servo and tracking servo controls are activated so that the focal point of the light beam follows the target tracks on the target information layer and the position of the objective lens 230 is controlled highly accurately.

The spherical aberration correction section 228 includes a correction lens (not shown), which can change its position in the optical axis direction, for example. And by adjusting the position of the correction lens, the degree of spherical aberration (i.e., the magnitude of correction) can be changed, which is a so-called "beam expander arrangement". However, the spherical aberration correction section 228 does not always have to have such a beam expander arrangement but may also have an arrangement for reducing the aberration by using a liquid crystal cell or a hinge.

The light beam that has been reflected from the target information layer of the optical disc 100 passes through the objective lens 230, the spherical aberration correction section 228 and the polarization beam splitter 226 and then enters the condenser lens 234, which converges the light that has been reflected from the optical disc 100 and then passed through the objective lens 230 and the polarization beam splitter 226 on the photodetector 236. In response, the photodetector 236 receives the light that has been transmitted through the condenser lens 234 and converts the optical signal into various kinds of electrical signals (i.e., current signals). The photodetector 236 may be a quadruple photodetector with four photosensitive areas.

The servo/format controller 106 shown in FIG. 7 includes a servo processing section 261, a focus control section 240, a tracking control section 241, a spherical aberration control section 242, a signal processing section (wobble detecting section) 250, an address detecting section 252, a layer information detecting section 254 and a CPU 246. The focus control section 240 performs a focus control in accordance with the FE signal. On the other hand, the tracking control section 241 performs a tracking control in accordance with the TE signal. In this example, the CPU 246 functions as a disc type recognizing section.

By performing matrix calculations on the output signals of the quadruple photodetector 236, various signals, including a push-pull signal (TS), an all sum signal, a tracking error signal (TE), a focus error signal (FE) and a read signal (RF signal), can be obtained. The all sum signal and the RF signal are generated by the same circuit. However, even though the RF signal is obtained from only an area where user data has been written, the all sum signal is also supplied from an area where no user data has been written yet (i.e., an unrecorded area). The push-pull signal includes a wobble signal. Based on these signals, the focus control and the tracking control are carried out. Also, address information is extracted from the push-pull signal. Also, in this preferred embodiment, the layer number information and the total number information can also be extracted from the push-pull signal (wobble signal).

Hereinafter, it will be described how to extract the layer number information and the total number information from the wobble signal and in what procedure the disc loading process will be carried out after that.

Figure 9:
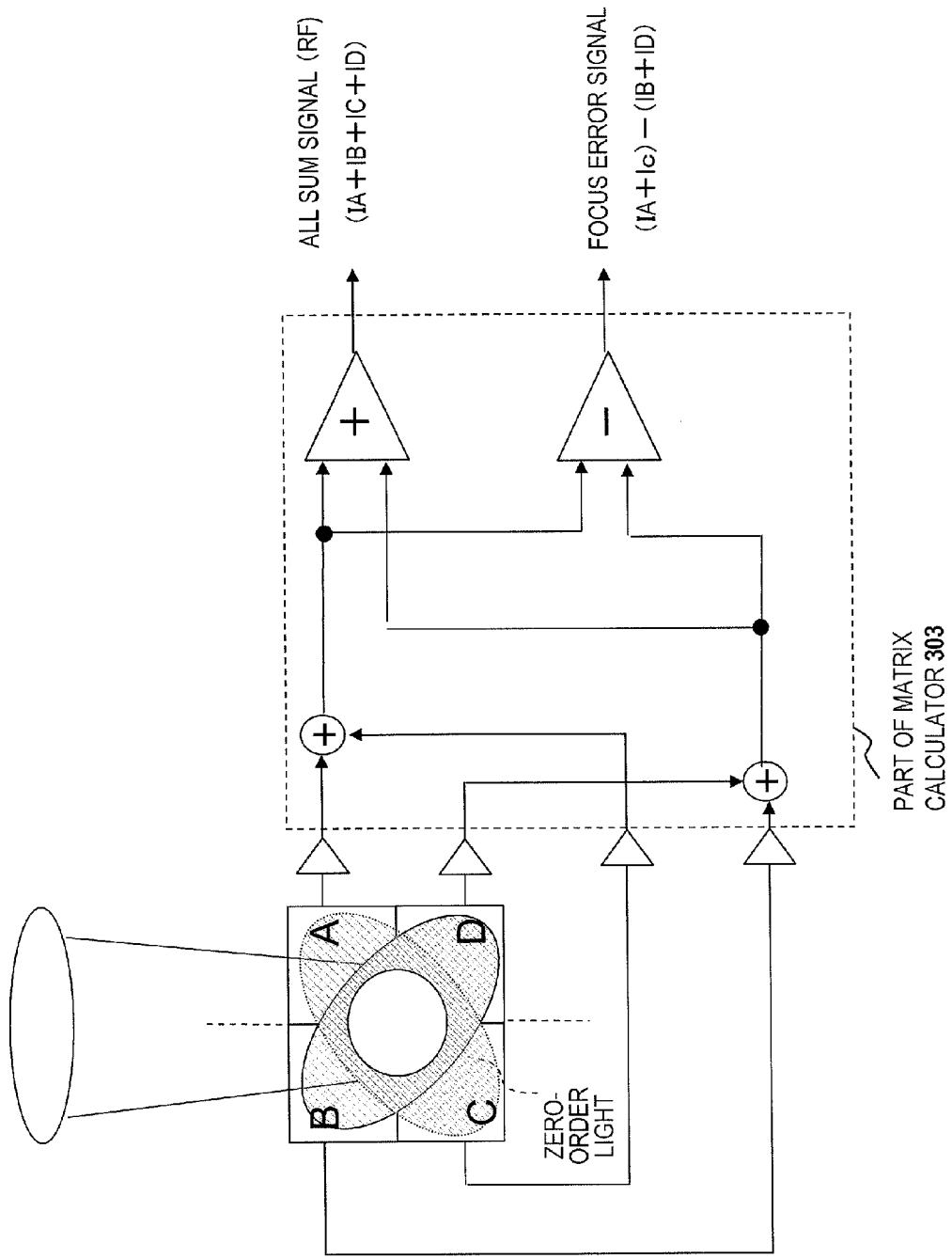
FIG. 9 is a block diagram illustrating, in further detail, a portion of a photodetector for generating a servo signal and an RF signal as a read signal in an optical disc drive as a preferred embodiment of the present invention.

FIG. 8 is a block diagram illustrating a configuration for the photodetector 236 shown in FIG. 6, the signal processing section 250 for detecting a wobble signal in the servo/format controller 106, and their surrounding circuit sections. FIG. 9 is a block diagram illustrating, in further detail, a portion of the photodetector 236 for generating a focus error signal and an RF signal as a read signal. And FIG. 10 is a block diagram illustrating, in further detail, another portion of the photodetector 236 for generating a tracking error signal and a wobble signal as another read signal.

First of all, it will be described, with reference to these drawings, how to generate a wobble signal in principle.

In FIG. 8, the output signal of the quadruple photodetector 301 is supplied to a matrix calculator 303 by way of preamplifiers a through d. The matrix calculator 303 detects astigmatism in the zero-order light of the photodetector as the difference between the diagonal sums of the respective output signals (IA+IC)-(IB+ID), thereby generating a focus error signal FE as shown in FIG. 9. Also, the matrix calculator 303 detects the sum of the intensities of the incoming light rays as the sum of the output signals of the quadruple photodetector 301 (IA+IC+IB+ID), thereby generating an RF signal as an AS signal.

Figure 10:
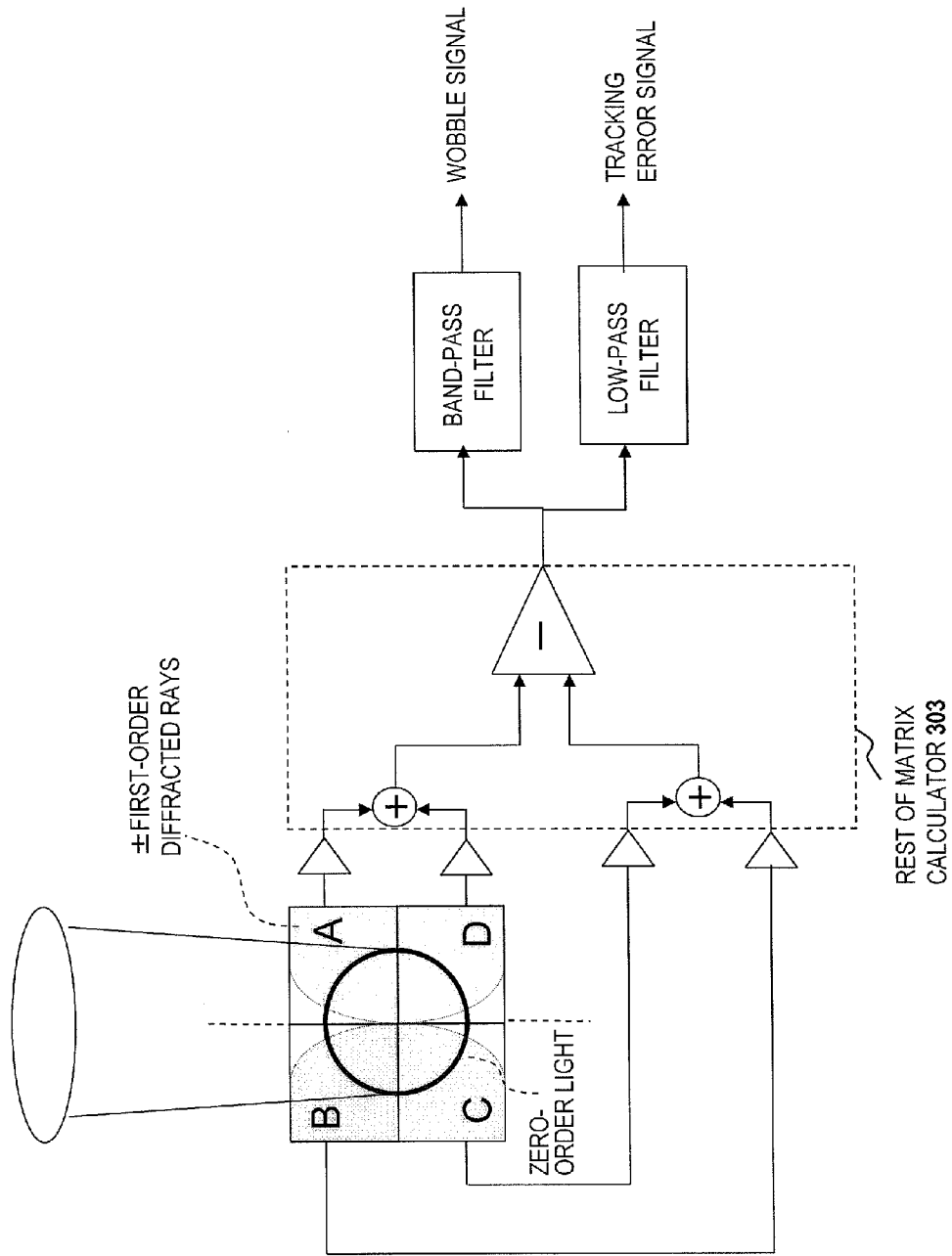
FIG. 10 is a block diagram illustrating, in further detail, a portion of the photodetector for generating a servo signal and a wobble signal as a read signal in the optical disc drive of the preferred embodiment of the present invention.
Figure 11:
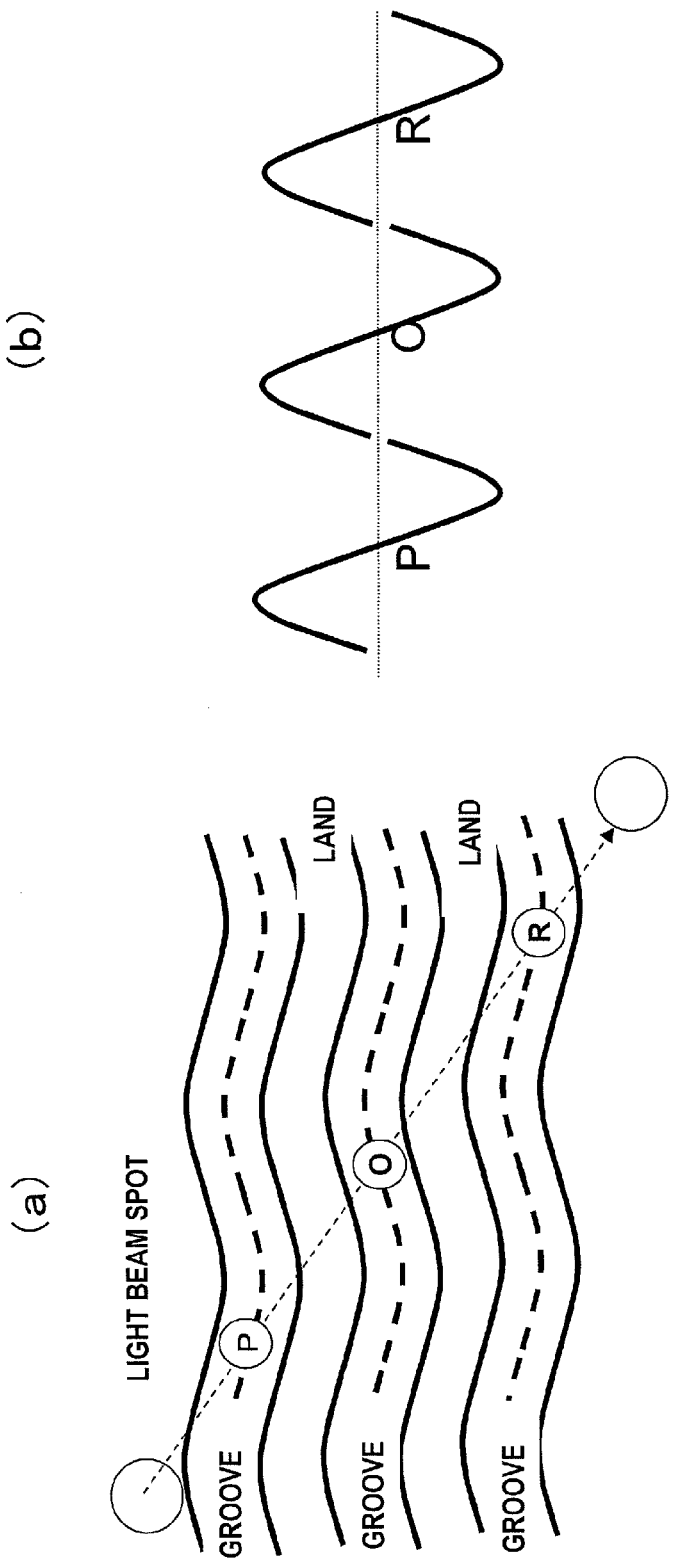
FIG. 11(a) illustrates a light beam spot that crosses wobbling tracks on an optical disc in Tracking OFF state.
FIG. 11(b) shows the waveform of a tracking error signal obtained in such a situation.
Figure 12:
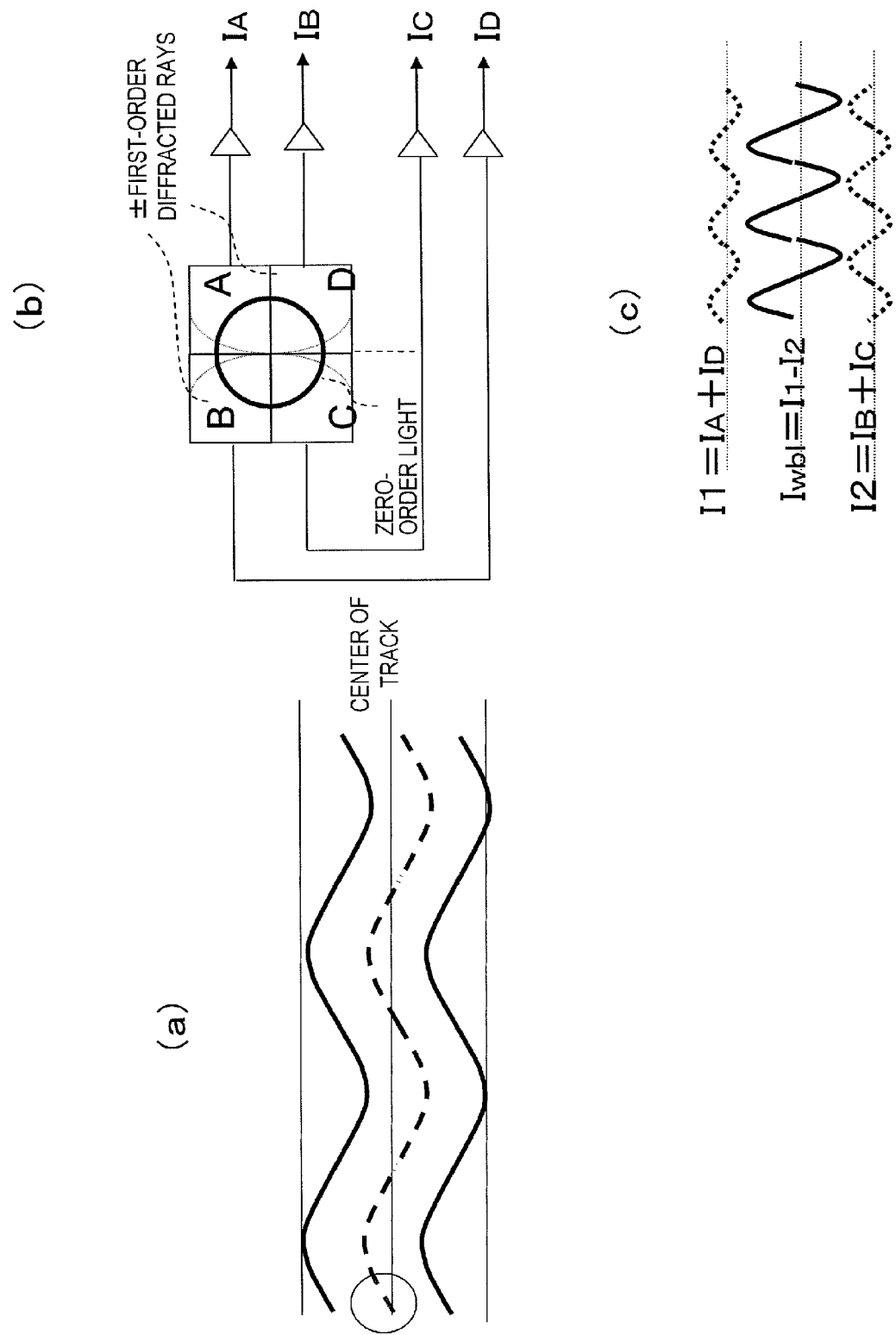
FIG. 12(a) illustrates how a light beam spot follows a wobbling track on an optical disc in Tracking ON state.
FIG. 12(b) illustrates how a wobble signal is generated.
FIG. 12(c) illustrates the waveform of a wobble signal obtained in the Tracking ON state.

As shown in FIG. 10, a difference signal representing the difference between the ±first-order diffracted rays that have been generated at the edges of wobbled tracks, consisting of lands and grooves, on the optical disc 100 (i.e., a push-pull signal) is detected as the difference between the two pairs of outputs of the quadruple photodetector 301 (IA+ID)-(IB+IC) that have been divided in the tracking direction. In Tracking OFF state, a tracking error signal with a sinusoidal waveform as shown in FIG. 11(b) is obtained as a push-pull signal every time the light beam crosses the land, groove, land and groove (i.e., P, O and R points) as shown in FIG. 11(a). In Tracking ON state, on the other hand, the wobbles at both edges of a track are represented as varying intensities of ±first-order diffracted rays with the same period as shown in FIG. 12(a). That is why if the push-pull signal shown in FIG. 12(c) is generated based on the outputs shown in FIG. 12(b), a wobble signal Iwbl, of which the waveform is represented by the solid curve in FIG. 12(c), can be obtained.

In general, to get a tracking control done with stability on an information layer on which a focus control is being carried out, the spherical aberration and the focus position are adjusted so as to maximize the push-pull TE signal. By making such adjustments, the wobble signal that is a push-pull signal to be generated based on the same ±first-order diffracted rays can also be optimized. That is why after the tracking control has been started, the layer number information (which will sometimes be referred to herein as "layer No. info") and the total number information can be obtained easily from the wobble signal constantly.

This wobble signal is input to the signal processing section 250 as shown in FIG. 8. The signal processing section 250 includes a band-pass filter 304 that extracts a wobble signal frequency and filters out unwanted noise components, an analog comparator 305, a counter 306, a latch 307 and a comparator 308. The analog comparator 305 outputs the push-pull signal TS shown in FIG. 13(a), which has been generated by the preamplifiers 302a through 302d and the matrix calculator 303, as an FM (frequency modulation) pulse signal shown in FIG. 13(b). More specifically, the FM pulse signal has been binarized and converted to be high if the level of the FM modulated signal is higher than a predetermined slice level and to be low if the former level is lower than the latter.

The counter 306 receives a system clock signal CK and a pulse signal that has been supplied from the analog comparator 305, counts the number of pulses of the clock signal CK, and outputs the count to the latch 307. That is to say, as shown in FIG. 13(c), the counter 306 resets itself responsive to a reset signal RST that has been generated based on an edge signal, and counts the leading and trailing edges.

As shown in portions (c) and (d) of FIG. 13, when its count reaches "N" indicating that one cycle is complete, the counter 306 is reset responsive to the reset signal RST and its count goes "0". Or after having been reset once, the counter 306 resumes counting again. And when its count reaches "N/2", the counter 306 is reset responsive to the reset signal RST. In this manner, the counts when the counter 306 is reset responsive to the reset signal RST are "N", "N", "N" "N" "N", "N/2", "N/2", "N" and "N", respectively.

The latch 307 receives not only the count that has been supplied from the counter 306 but also the two edge signals. At the timings represented by the two edge signals, the latch 307 holds the counts. As shown in portion (d) of FIG. 13, the latch 307 holds the count whenever the counter 306 is reset. Then, the count held is output to the digital comparator 308.

The digital comparator 308 receives not only the count that has been supplied from the latch 307 but also a threshold count "3N/4". Then, the digital comparator 308 compares the count supplied from the latch 307 to the threshold, removes a high frequency component "N/2" from the FM modulated signal and outputs "0" as shown in portion (e) of FIG. 13. The FM modulated signal that has been subjected to such comparison processing is output to the layer information detecting section 254.

The layer information detecting section 254 detects the output value of the FM modulated signal when a predetermined count is reached. Specifically, the CPU 246 (functioning as a disc type recognizing section) gets the output value of the FM modulated signal by reference to the layer-by-layer recognition information table shown in FIG. 14 (to be described later), thereby sensing how many wobbles have passed since the sync signal SYNC was supplied when the digital comparator 308 no longer supplies any output.

This result of detection is input to the CPU 246. By detecting the first "0" in the first half of one information frame (consisting of 93 wobbles), the CPU 246 can detect the total number of information layers included in the given disc (i.e., what is the number of layers that the given disc has). And by detecting the next "0" in the second half of the information frame, the CPU 246 can detect which information layer the focus position is now set on. If no "0" can be detected in the first half, the total number of information layers included should be one. On the other hand, if no "0" can be detected in the second half, the focus position should be now located on the L0 layer.

FIG. 15 shows wobble position patterns where "0" is detected by using the total number information to be detected in the first half of one information frame and the layer No. info to be detected in the second half (which indicates the information layer on which the light beam spot is now located).

Portions (a) through (c) of FIG. 16 illustrate the patterns of wobbles to be left on the L1, L2 and L3 layers, respectively, in a situation where the given optical disc has eight information layers. Each of the wobbled patterns shown in portions (a), (b) and (c) of FIG. 16 includes a portion representing the total number of information layers included and a portion representing the current layer number, which correspond to a former area consisting of five wobbles and a latter area consisting of twenty wobbles, respectively. That is to say, the former area represents the total number of information layers included and the latter area represents the number of the information layer on which the light beam spot is currently located.

In the example illustrated in portions (a) to (c) of FIG. 16, the number of wobbles subjected to FM modulation is two. This is done in order to never fail to detect at least one of the two wobbles that have been subjected to the FM modulation even if the other wobble collapsed. However, either only one wobble or even three or more wobbles could be subjected to FM modulation as well.

In portion (a) of FIG. 16, zero is detected for the first time as the output value of the FM modulated signal at the third wobble since the carrier wave has been produced, and zero is detected next time at the first wobble after the next carrier wave has been produced. That is why it can be seen that the given optical disc has eight information layers and that the light beam spot is currently located on the L1 layer. On the other hand, in portion (c) of FIG. 16, zero is detected for the first time as the output value of the FM modulated signal at the third wobble since the carrier wave has been produced, and zero is detected next time at the third wobble after the next carrier wave has been produced. That is why it can be seen that the given optical disc also has eight information layers but that the light beam spot is currently located on the L3 layer.

In the example described above, there is one-to-one correspondence between a particular wobble location and its associated information layer. However, if the first, second and third wobbles are subjected to the FM modulation as shown in FIG. 17, then the layer recognition information "0" can be detected at each wobble location. That is why each layer number can be identified by their sum.

In the preferred embodiment described above, the "layer information" including the total number information and the layer number information is incorporated by FM modulation. However, the "layer information" may also be incorporated by another modulation technique such as phase modulation or amplitude modulation.

Also, in the preferred embodiment described above, the "layer information" including the total number information and the layer number information is incorporated in the wobbled tracks. However, the layer information does not always have to be stored in that manner. Alternatively, a portion with a unique physical shape such as a land pre-pit for a DVD-R or an address pre-pit for a DVD-RAM may be arranged on or around a track, thereby recording the "layer information" there.

Embodiment 2

Hereinafter, a second specific preferred embodiment of an optical disc drive according to the present invention will be described.

The optical disc drive of this preferred embodiment has the same configuration as the counterpart of the first preferred embodiment described above. However, the optical disc drive of this second preferred embodiment performs a different type of processing while carrying out a disc loading process on the given optical disc, which is a major difference from the first preferred embodiment described above.

In a multilayer optical disc for use in this preferred embodiment, the reference layer is arranged as the deepest layer under the disc surface. And among a number of information layers that are located between the disc surface and the reference layer, the layer number information and the total number information are stored on the tracks of one of those information layers, which is located closer to the disc surface than any other information layer.

FIG. 18A is a flowchart showing the procedure of the disc loading process according to this preferred embodiment, while FIG. 18B is a flowchart showing the procedure of a typical disc loading process to be carried out by a conventional optical disc drive.

First, in Step ST1, the spherical aberration is set by the spherical aberration correction section 228 so that the shallowest layer of a multilayer optical disc, which has a thinner cover layer than any other one of multiple types of multilayer optical discs that the optical disc drive is compatible with, has its spherical aberration minimized.

As the objective lens is raised, the focus position of the light beam, which is still located under the optical disc, moves upward. And the focus position of the light beam soon passes the disc surface, when an S-curve appears on the waveform of the FE signal that has been generated based on the reflected light. Next, the focus position of the light beam further moves upward to pass one information layer after another. And every time the focus position passes an information layer, a similar S-curve will appear on the waveform of the FE signal. The focus finding (or focus search) operation is carried out by reference to such an S-curve of the FE signal. That is why if the S-curve had too small amplitude, it would be impossible to set the focus on that information layer and start the focus control operation.

The greater the total number of information layers included in the given multilayer optical disc, the smaller the amplitude of the S-curve obtained from its shallowest layer. And the greater the total number of information layers included in the given multilayer optical disc, the lower the power of the light beam focused on its deepest information layer tends to be. The reason is that as the light beam focused on the deepest information layer has passed all of the other information layers, the power of the light beam has been further attenuated every time the light beam passes each of those information layers. And to minimize such a decline in the power of the light beam, the greater the total number of information layers included in a multilayer optical disc, the higher the transmittance of each of those information layers and the lower its reflectance should be. That is why as the total number of information layers included in a multilayer optical disc increases, the shallowest information layer that is located closer to the disc surface than any other information layer also comes to have lower and lower reflectance. Meanwhile, the greater the total number of information layers included in a multilayer optical disc, the shorter the distance from the disc surface to the shallowest layer (i.e., the shallower the shallowest layer). Consequently, in various types of multilayer optical discs that the optical disc drive is compatible with, if the shallowest layer of an optical disc is located at the smallest depth under the disc surface, then the S-curve obtained from that shallowest layer has smaller amplitude than any other S-curve obtained from the other optical discs.

In view of these considerations, in order to avoid missing such an S-curve with the smallest amplitude, if the optical disc drive is compatible with a number of multilayer optical discs, the spherical aberration is defined according to this preferred embodiment so as to be minimized at the shallowest layer of one of those optical discs that has the thinnest cover layer. In that case, even if an information layer with low reflectance is present at that depth (i.e., even if the multilayer optical disc loaded has a greater number of information layers than any other one of the multilayer optical discs), a definite S-curve can still be detected from that shallowest information layer.

It should be noted that if the given multilayer optical disc has a relatively small number of information layers (if it is a three- or four-layer optical disc, for example), then the shallowest layer of such a multilayer optical disc is located at a deeper level. In that case, if the spherical aberration is defined as described above, the shallowest layer of such an optical disc does not have the minimized spherical aberration. That is to say, if the multilayer optical disc loaded has such a small number of information layers, the spherical aberration will rather increase when the focus position of the light beam is located on the shallowest layer. In such a multilayer optical disc, however, even the shallowest layer thereof has such high reflectance that the amplitude of the S-curve obtained from that layer can be large enough to get the focus finding operation done.

After the spherical aberration has been defined as described above, the objective lens 230 is gradually raised in Step ST2 from its rest position under the optical disc (i.e., from a position farthest away from the optical disc) toward the optical disc 100.

Next, in Step ST3, an S-curve is detected from the shallowest layer, when the objective lens 230 stops being raised and a focus finding operation (or focus control operation) is started.

Subsequently, in Step ST4, it is determined by the amplitude of the TE signal whether the focus finding operation has been done successfully or not. Specifically, if the amplitude of the TE signal is greater than zero, it is determined that the focus finding operation has been done successfully and the process advances to Step ST6, in which the tracking control is started. Next, in Step ST7, the layer information (including the total number information and the layer number information) is retrieved from the shallowest layer. On the other hand, if the amplitude of the TE signal has turned out to be zero in Step ST4, then the processing step ST5 of recovering from a focus lost state is carried out.

After the layer information detecting section 254 has retrieved the layer information in Step ST7, the CPU 246 determines, in the next processing step ST8, whether the information layer on which the focus has been found successfully is the target information layer (i.e., the reference layer in this case) or not. If the answer is YES, the process advances to the next processing step.

On the other hand, if the answer is NO (i.e., unless that information layer is the reference layer), then the CPU 246 determines, by reference to the layer information, how many information layers should be passed to shift the focus position from the current information layer to the reference layer on target (i.e., determines the distance between those two information layers). In that case, the tracking control is stopped in Step ST9 and then a focus jump operation is performed in the next processing step ST10.

Hereinafter, it will be described with reference to FIG. 17B how to get the conventional disc loading process done just for your reference.

According to the conventional procedure, first of all, in Step ST11, the spherical aberration is set so as to be minimized at the deepest information layer in a multilayer optical disc that the optical disc drive is compatible with. As for a BD, its deepest layer (i.e., information layer L0) is located at a depth of 100 µm±5 µm. That is why the spherical aberration is defined so as to be minimized at that depth of 100 µm.

Next, while the objective lens is raised in Step ST12 toward the optical disc from the point that is farthest away from the optical disc, the amplitude of the S-curve is measured in Step ST13. The objective lens is raised to the point that the focus position will reach the deepest layer (that is located at a depth of 100 µm). And if the amplitude (or the gradient) of the S-curve gets equal to or greater than a predetermined value when the focus position reaches the depth of 100 µm, the zero cross point of that S-curve is determined to represent the deepest layer in Step S14 and the focus is set on that layer.

Next, in Step ST15, it is determined, by the amplitude of the TE signal, whether the focus finding operation has been done successfully or not. If the amplitude is greater than zero, then it is determined that the focus finding operation has been done successfully and the tracking control is started in Step S17. Next, in Step ST18, the physical address is read. On the other hand, if the amplitude of the TE signal has turned out to be zero in Step ST15, then the processing step ST16 of recovering from a focus lost state is carried out.

Subsequently, in Step ST19, it is determined, by reference to the address information retrieved, whether or not the current information layer is the deepest layer on target. If the answer is YES, the process advances to the next processing step. Otherwise, the focus control is stopped in Step ST20 and then the same series of processing steps are carried out all over again with the objective lens raised gradually toward the optical disc.

Hereinafter, it will be described how to access the information layer L0, which is the reference layer of a multilayer optical disc (such as a multilayer BD), during the disc loading process.

That is to say, it will be described how to get to that information layer L0.

FIG. 19A illustrates how the lens moves with respect to the disc and how the focus error (FE) and focus drive (FED) signals change their waveforms in the meantime in a situation where the disc loading process is carried out following the procedure of this preferred embodiment. On the other hand, FIG. 19B illustrates how the lens moves with respect to the disc and how the focus error (FE) and focus drive (FED) signals change their waveforms in the meantime in a situation where the disc loading process is carried out following the conventional procedure.

In the example illustrated in FIG. 19A, the lens is raised from its rest position at a relatively velocity initially and a focus finding operation is carried out on the shallowest layer (i.e., the information layer L3). Then, the layer information is retrieved from the information layer L3 to sense that the given optical disc is a four-layer disc and that the current information layer is the information layer L3 that is the fourth deepest (i.e., shallowest) layer as counted from its deepest layer.

Thus, it can be seen that to shift the focus position to the information layer L0 that is the reference layer on target, a focus jump operation should be performed so as to jump the three intervening information layers. Therefore, pulses P1 and P2 are set so that the focus position will pass those three information layers and the focus jump operation is performed so that the focus position moves toward the information layer L0.

In that case, three S-curves will appear on the waveform of the FE signal as shown in FIG. 19A. By counting those S-curves, a braking pulse P2 is applied at an appropriate timing, thereby decreasing the velocity of the focus position on the move. After that, the focus position is tentatively set on the information layer L0.

In this case, the time it takes for the focus position to reach the information layer L0 is the sum of the time TAUD for raising the lens from its rest position to the point that the focus is set on the information layer L3 and the time TAJP for making the focus jump those three intervening layers.

According to this preferred embodiment, the time for getting the focus jump done can be shorter than the time TAUD for raising the lens initially for the following reasons:

1) The distance to jump (i.e., three layers in this case) for the focus position is already known;

2) The distance between the two information layers L3 and L1 is much shorter than the distance from the farthest point to the shallowest layer (i.e., the information layer L3);

3) Even if the level of the information layer L0 varied to a certain degree due to out-of-plane vibrations (or disc flutter) of the optical disc, the level of the information layer L0 can still be estimated accurately by the peak to peak interval or the width of the S-curves of the FE signal. Thus, the braking pulse P2 can be applied at an appropriate timing. As a result, the focus position can be set highly accurately on the information layer L0.

Specifically, the time TAUD is a matter of 0.3 to 0.5 seconds, while the time TAJP is a matter of 0.1 to 0.3 seconds. Thus, TAUD+TAJP is approximately 0.4 to 0.8 seconds. According to this preferred embodiment, the information layer L0 can be reached in such a short time.

On the other hand, according to the conventional method, the lens is gradually raised at a relatively low velocity so that the focus position moves from the farthest point toward the information layer L0 as shown in FIG. 19B. And it is sensed by the level of the FED voltage that the focus position has reached the vicinity of the information layer L0, and the focus finding operation is performed on that information layer L0. According to this method, there is no need to perform any focus jump operation. However, if the lens were raised too fast, it would be difficult to set the focus position on the information layer L0. For that reason, the lens should be raised at sufficiently low velocities. Consequently, the time TBUD it would take to set the focus position on the information layer L0 and get the focus finding operation done there will be approximately 1.0 to 2.0 seconds.

As can be seen easily from the foregoing description, the optical disc drive of the present invention never attempts to get the focus finding operation done on the deepest reference layer at a time. Instead, the drive of the present invention once sets a focus position on a shallower information layer and then shifts the focus position to the reference layer by focus jumping. In this manner, it will take a significantly shorter time to get to the reference layer.

In addition, according to this preferred embodiment, the focus position is once set on that shallower information layer than the reference layer, information about the total number of information layers included is retrieved from that shallower information layer, and then the relative position of the reference layer with respect to that shallower layer is determined. Consequently, the focus position can be shifted quickly to the reference layer on target.

On top of that, according to a preferred embodiment of the present invention, supposing the given optical disc is an eight-layer BD, of which the reference layer is information layer L0, for example, even if the focus position has failed to be set on the information layer L7 that is located closest to the disc surface and has been set on the information layer L6 by mistake, that information layer can still be recognized as the seventh deepest information layer L6 in the eight-layer optical disc. That is why even in such a situation, the focus position can still be shifted back to the information layer L7. Also, by getting the focus jump operation done on the information layers L5, L4, L3, L2, L1 and L0 in this order, the deepest information layer can still be reached just as intended. Thus, according to this preferred embodiment, the focus finding operation can get done on the deepest information layer with the overall disc loading process time shortened.

Furthermore, according to a preferred embodiment of the present invention, even if the reference layer is located deep inside the disc, the focus position is temporarily set on a shallower information layer, and therefore, the chances of unintentional collision between the objective lens of the optical pickup and the optical disc are far slimmer. As for an optical disc on which important data is written (e.g., an optical disc for use in medical applications, among other things), damage that could be done on the optical disc due to such a collision between the lens and the disc should be minimized in one way or another. That is why high reliability will be achieved in such a situation by applying the present invention.

As described above, according to the optical disc drive driving method of the present invention, even if the given optical disc is a multilayer optical disc that has three or more information layers (which could be as many as sixteen or twenty layers), the focus can still be set on the target information layer quickly with the chances of collision of the lens against the optical disc reduced significantly.

In the preferred embodiments of the present invention described above, information about the total number of information layers included in the given multilayer optical disc and layer number information, indicating on which information layer the focus position is now located, are supposed to be stored on each and every information layer of the multilayer optical disc. However, the total number information and the layer number information do not always have to be stored on every information layer but could be stored on only a particular information layer (e.g., just on the shallowest information layer that is located closer to the disc surface than any other information layer is). Or the total number information and the layer number information could be stored on all information layers but the reference layer. Furthermore, in the preferred embodiments of the present invention described above, the total number information of the multilayer optical disc and the layer number information are supposed to be respectively represented by the first and second halves of a wobble signal by pre-formatting. Alternatively, those two kinds of information could also be respectively represented by the wobble signal's second and first halves by pre-formatting.

INDUSTRIAL APPLICABILITY

The present invention can be used as an optical disc drive for a BD recorder or player that is compatible with a multilayer optical disc. Optionally, the present invention is also applicable to an optical disc compliant with any other standard, not just BDs.

REFERENCE SIGNS LIST 100 multilayer optical disc
100a disc surface (light incident surface)
100b cover layer
100c wobbling track
101 disc motor
102 driver
103 optical pickup
104 RF servo amplifier
106 servo/format controller
130 system controller
230 objective lens
246 CPU (disc type recognizing section)
250 signal processing section
254 layer information detecting section

The invention claimed is:

1. A method of driving an optical disc drive compatible with multiple types of multilayer optical discs, wherein each of the multiple types of multilayer optical discs comprises multiple information layers that include a reference layer on which management information, including information about the type of the multilayer optical disc is stored, at least one more information layer on each of which layer number information indicating its own place in the multiple information layers and information about the total number of the information layers included are both stored, and a cover layer,
wherein during a loading process of a multilayer optical disc carried out by the optical disc drive, the method comprises the steps of:

(A) setting the focus position of a light beam on a target one of the information layers of the multilayer optical disc, on which the layer number information and the total number information are both stored, and performing a focus control and a tracking control on that target layer;

(B) retrieving the layer number information and the total number information from the target information layer; and (C) shifting the focus position of the light beam from that target information layer, from which the layer number information and the total number information have been retrieved, to the reference layer after the step (B) has been performed;

wherein the step (A) includes setting a spherical aberration setting of the optical disc drive to a value at which the shallowest layer of a multilayer optical disc among the multiple types of multilayer optical discs having a thinner cover layer than any of the other multiple types of multilayer optical discs that the optical disc drive is compatible with, has its spherical aberration minimized, and setting the focus position of the light beam on one of the information layers of the multilayer optical disc, which is located closer to the surface of the multilayer optical disc than the reference layer is and on which the layer number information and the total number information are stored, and performing a focus control and a tracking control on that information layer.

2. An optical disc drive that is compatible with a multilayer optical disc comprising multiple information layers that include a reference layer on which management information, including information about the type of the optical disc loaded, is stored and at least one more information layer, on each of which layer number information, indicating its own place in the multiple information layers, and information about the total number of the information layers included are both stored, the drive comprising:
a driving section for rotating the optical disc loaded;
an optical pickup having the ability to set the focus position of a light beam on an arbitrary one of the information layers of the optical disc;
a control section, which controls the optical pickup to set the focus position of the light beam on a target one of the information layers of the multilayer optical disc on which the layer number information and the total number information are stored, and which performs a focus control and a tracking control on that target information layer; and
a layer information detecting section for retrieving, in response to a signal supplied from the optical pickup, the layer number information and the total number information from the target information layer,
wherein before setting the focus position of the light beam on the reference layer of the optical disc and performing a focus control and a tracking control on the reference layer, the control section sets a spherical aberration so that the shallowest layer of the multilayer optical disc, which has a thinner cover layer than any other one of multiple types of multilayer optical discs that the optical disc drive is compatible with, has its spherical aberration minimized, and the control section sets the focus position of the light beam on one of the information layers, which is located closer to the surface of the optical disc than the reference layer is and on which the layer number information and the total number information are stored, and performs the focus control and the tracking control on that layer, and wherein the layer information detecting section retrieves the layer number information and the total number information from that information layer that is located closer to the surface of the optical disc than the reference layer is.

* * * * *